US012632755B2

(12) United States Patent
Hendrickson et al.

(10) Patent No.: US 12,632,755 B2
(45) Date of Patent: May 19, 2026

(54) SYSTEM AND METHOD USING MULTILAYER OPTICAL LATTICE QUBIT ARRAYS FOR QUANTUM COMPUTING

(71) Applicant: KBR WYLE SERVICES, LLC, Houston, TX (US)

(72) Inventors: Peter Carl Hendrickson, Reston, VA (US); Jadon Daniel Erwin, Herndon, VA (US)

(73) Assignee: KBR Wyle Services, LLC, Houston, TX (US)

( * ) Notice: Subject to any disclaimer, the term of this patent is extended or adjusted under 35 U.S.C. 154(b) by 736 days.

(21) Appl. No.: 17/739,014

(22) Filed: May 6, 2022

(65) Prior Publication Data

US 2023/0015801 A1 Jan. 19, 2023
US 2024/0020559 A9 Jan. 18, 2024

Related U.S. Application Data

(63) Continuation-in-part of application No. 17/090,747, filed on Nov. 5, 2020, now Pat. No. 11,770,984.

(Continued)

(51) Int. Cl.
*G06N 10/00* (2022.01)
*G06N 10/20* (2022.01)
*G06N 10/40* (2022.01)

(52) U.S. Cl.
CPC ............. *G06N 10/00* (2019.01); *G06N 10/20* (2022.01); *G06N 10/40* (2022.01)

(58) Field of Classification Search
CPC ............................... G06N 10/20; G06N 10/40
See application file for complete search history.

(56) References Cited

U.S. PATENT DOCUMENTS 5,793,091 A * 8/1998 Devoe .................... G06N 10/40
257/17
6,437,413 B1 * 8/2002 Yamaguchi ............ G06N 10/40
257/14

(Continued)

FOREIGN PATENT DOCUMENTS

CA 3157734 5/2021
CN 114938669 A1 8/2022

(Continued)

OTHER PUBLICATIONS

J.I. Cirac & P. Zoller, Institute for Theoretical Physics, University of Innsbruck, Austria "A Scalable Quantum Computer with Ions in an Array of Microtraps," Nature, vol. 404, p. 579-58, (2000) www.nature.com.

(Continued)

*Primary Examiner* — Matthew L Reames
(74) *Attorney, Agent, or Firm* — Womble Bond Dickinson (US) LLP

(57) ABSTRACT

A quantum computing (QC) system includes a first plurality of logical qubits in a first substantially planar region and a second plurality of logical qubits in a second substantially planar region that is substantially parallel to the first substantially planar region. At least some of the first plurality of logical qubits are configured to interact with one another, and at least some of the second plurality of logical qubits are configured to interact with one another and to interact with the at least some of the first plurality of logical qubits. The QC system can include additional pluralities of logical qubits in additional substantially planar regions that are substantially parallel to the first and second substantially planar regions and at least some of the second plurality of logical qubits can be configured to interact with one or more of the additional pluralities of logical qubits.

27 Claims, 27 Drawing Sheets

Related U.S. Application Data

(60) Provisional application No. 63/186,037, filed on May 7, 2021, provisional application No. 62/933,148, filed on Nov. 8, 2019.

(56) References Cited

U.S. PATENT DOCUMENTS

| | | | |
|---|---|---|---|
| 7,277,872 | B2 | 10/2007 | Raussendorf et al. |
| 9,858,531 | B1 | 1/2018 | Monroe et al. |
| 10,192,168 | B2 | 1/2019 | Rigetti et al. |
| 10,248,491 | B1 | 4/2019 | Zeng et al. |
| 11,157,826 | B2 | 10/2021 | Figgatt et al. |
| 11,354,589 | B2 | 6/2022 | Kim et al. |
| 2006/0179029 | A1 | 8/2006 | Vala et al. |
| 2012/0319684 | A1* | 12/2012 | Gambetta .............. G06N 10/40 257/31 |
| 2016/0125311 | A1* | 5/2016 | Fuechsle ................ H10N 69/00 257/31 |
| 2016/0335560 | A1 | 11/2016 | Mohseni et al. |
| 2017/0337155 | A1 | 11/2017 | Novotny |
| 2018/0114138 | A1 | 4/2018 | Monroe et al. |
| 2018/0175241 | A1 | 6/2018 | Jain |
| 2019/0229189 | A1 | 7/2019 | Clarke et al. |
| 2021/0027188 | A1 | 1/2021 | Nickerson et al. |
| 2021/0142204 | A1 | 5/2021 | Hendrickson et al. |
| 2022/0366287 | A1 | 11/2022 | Hendrickson et al. |

FOREIGN PATENT DOCUMENTS

| | | |
|---|---|---|
| EP | 4055532 | 9/2022 |
| GB | 2606876 | 11/2022 |
| HK | 40080078 A | 4/2023 |
| JP | 2002112391 A | 4/2002 |
| JP | 2019531592 | 10/2019 |
| JP | 2023500405 | 1/2023 |
| WO | 2017214331 | 12/2017 |
| WO | 2019178009 | 9/2019 |
| WO | 2020033692 | 2/2020 |
| WO | 2021092233 A1 | 5/2021 |
| WO | 2022250933 A2 | 12/2022 |

OTHER PUBLICATIONS

J. Chiaverini et al., Rinton Press, Surface-Electrode Architecture for Ion-Trap Quantum Information Processing, Quantum Information and Computation, vol. 5, No. 6 (2005) pp. 419-439.

N.M. Linke et al., Joint Quantum Institute, Department of Physics, University of Maryland "Experimental Comparison of Two Quantum Computing Architectures," PNAS, vol. 114, No. 13 (2017) pp. 3305-3310.

C. Figgatt et al., Nature, "Parallel Entangling Operations on a Universal Ion-Trap Quantum Computer," vol. 571 (2019) {https://www.nature.com/articles/s41586-019-1427-5}.

Y. Lu et al., Nature, "Global Entangling Gates on Arbitrary Qubits," vol. 571 (2019) {https://www.nature.com/ articles/s41586-019-1428-4}.

R. Samajdar, PNAS, "Quantum Phases of Rydberg Atoms on a Kagome Lattice," Proc. Natl. Acad. Sci. U.S.A. 118, e2015785118 (2021) {https://www.pnas.org/doi/10.1073/pnas.2015785118}.

J.I. Cirac and P. Zoller, the American Physical Society "Quantum Computations with Cold Trapped Ions," Physical Review Letter, vol. 74, No. 20, (1995) pp. 4091-4094.

T. Monz et al., Physical Review Letters, "Realization of the Quantum Toffoli Gate with Trapped Ions," Phys. Rev. Lett. 102, 040501 (2009) {https://pubmed.ncbi.nlm.nih.gov/19257408/}.

S. Debnath et al., Nature, "Demonstration of a Small Programmable Quantum Computer with Atomic Qubits," vol. 536, pp. 63-66 (2016) {https://pubmed.ncbi.nlm.nih.gov/27488798/}.

A. Kitaev, Annals of Physics, "Anyons in an Exactly Solved Model and Beyond," Phys. bol. 321, Issue 1, (2006), pp. 2-111 {https://www.sciencedirect.com/science/article/abs/pii/S0003491605002381}.

R. Schmied et al., IOP Institute of Physics Quantum Simulation of the Hexagonal Kitaev Model with Trapped Ions, New Journal of Physics 13 115011 (2011) ("Schmied 2011") 23 pp.

R. Schmied, et al., Physical Review Letters, "Optimal Surface-Electrode Trap Lattices for Quantum Simulation with Trapped Ions", Phys Rev. 102, 233002 (2009) ("Schmied 2009") 4 pages.

D.J. Wineland et al., Journal of Research of the National Institute of Standards and Technology, "Experimental Issues in Coherent Quantum-State Manipulation of Trapped Atomic Ions", J. Res. Natl. Inst. Stand. Technol. vol. 103, 259 (1998) pp. 259-328.

C.W. Hogle et al., Sandia National Laboratories "Characterization of Microfabricated Surface Ion Traps," SAND2017 6113C (2017).

C.E. Pearson et al., Physical Review A "Experimental Investigation of Planar Ion Traps," Phys. Rev. A 73, 032307 (2006) {https://journals.aps.org/pra/abstract/10.1103/PhysRevA.73.032307}.

M. Mielenz et al., Nature Communications, "Arrays of Individually Controlled Ions Suitable for Two-Dimensional Quantum Simulations," 711839 (2016) pp. 1-9.

C. Ospelkaus et al., Physical Review Letters, "Trapped-Ion Quantum Logic Gates Based on Oscillating Magnetic Fields," Phys Rev. Lett. 101, 090502 (2008) {https://journals.aps.org/prl/abstract/10.1103/PhysRevLett.101.090502}.

T.P. Harty et al., Physical Review Letters, "High-Fidelity Preparation, Gates, Memory, and Readout of a Trapped-Ion Quantum Bit," Phys Rev. Lett. 113, 220501 (2014) {https://journals.aps.org/prl/abstract/10.1103/PhysRevLett.113.220501}.

T. Roy, et al., Tata Institute of Fundamental Research, "A Programmable Three-Qubit Superconducting Processor with All-To-All Connectivity," Department of Condensed Matter Physics and Materials Science (2018) pp. 1-11.

M. Storcz, Physics Department, Arnold Sommerfeld Center for Theoretical Physics, and Center for Nanoscience, "Intrinsic Phonon Decoherence and Quantum Gates in Coupled Lateral Quantum-Dot Charge Qubits," Physical Review B 72, 235321 (2005) 10 pages.

D. Stick et al., Nature Physics, "Ion Trap in a Semiconductor Ship" Nature Phys 2, 36-39 (2006) {https://www.nature.com/articles/nphys171}.

P. Maunz, Sandia National Laboratories, "Characterization of a High-Optical-Access Surface Trap Optimized for Quantum Information Processing," SAND2015-1045C (2015).

S.E. Anderson, et al., Physical Review Letters, "Trapping Rydberg Atoms in an Optical Lattice," Phys. Rev. Lett. 107, 263001 (2011) {https://journals.aps.org/prl/abstract/10.1103/PhysRevLett.107.263001}.

I. Bloch, Nature, "Quantum Coherence and Entanglement with Ultracold Atoms in Optical Lattices," Nature 453, 1016-1022 (2008) {https://www.nature.com/articles/nature07126}.

C. E. Bradley et al., Physical Review X, "A 10-Qubit Solid-State Spin Register with Quantum Memory Up to One Minute," Phys. Rev. X 9, 031045 (2019) {https://journals.aps.org/prx/abstract/10.1103/PhysRevX.9.031045}.

M. Saffman et al., Reviews of Modern Physics, "Quantum Information with Rydberg Atoms," Rev. Mod. Phys. 82, 2313 (2010) {https://journals.aps.org/rmp/abstract/10.1103/RevModPhys.82.2313}.

K. Maller et al., Physical Review A, "Rydberg-Blockade Controlled-NOT Gate and Entanglement in a Two-Dimensional Array of Neutral-Atom Qubits," Phys. Rev. A 92, 022336 (2015) {https://journals.aps.org/pra/abstract/10.1103/PhysRevA.92.022336}.

D. Petrosyan et al., Physical Review A, "High-Fidelity Rydberg Quantum Gate Via a Two-Atom Dark State," Phys. Rev. A 96, 042306 (2017) {https://journals.aps.org/pra/abstract/10.1103/PhysRevA.96.042306}.

M. Khazali and K. Molmer, Physical Review X, "Fast Multiqubit Gates by Adiabatic Evolution in Interacting Excited-State Manifolds of Rydberg Atoms and Superconducting Circuits," Phys. Rev. X 10, 021054 (2020) {https://journals.aps.org/prx/abstract/10.1103/PhysRevX.10.021054}.

I. Bloch, Nature Physics, "Ultracold Quantum Gases in Optical Lattices," 1, 23-30 (2005) {https://www.nature.com/articles/nphys138}.

T.M. Graham et al., Physical Review Letters, "Rydberg-Mediated ENtanglement ina Two-Dimensional Neutral Atom Qubit Array,"

(56) References Cited

OTHER PUBLICATIONS

Phys. Rev. Lett. 123, 230501 (2019) {https://journals.aps.org/prl/abstract/10.1103/PhysRevLett.123.230501}.

A Bautista-Salvador et al., "Multilayer ion Trap Technology for Scalable Quantum Computing and Quantum Simulation", 2019 New Journal of Physics, 21 043011 (Year: 2019).

Jones C. et al., Logical Qubit in a Linear Array of Semiconductor Quantum Dots, Physical review X, Jun. 1, 2018, vol. 8, Issue 2, pp. 021058-1 to 021058-31. [retrieved Oct. 13, 2023]. Retrieved from [URL: https;//journals.aps. org/prx/abstract/10.1103/PhysRevX.8. 021058].

Ravi et al., A Three Dimensional Lattice of Ion Traps, arxiv.org, Cornell University Library, 201 Olin Library Cornell University Ithaca, NY 14853, Jul. 27, 2009.

Goel et al., Native multiqubit Toffoli gates on ion trap quantum computers, arxiv.org, Cornell University Library, 201 Olin Library Cornell University Ithaca, NY 14853, Feb. 28, 2021.

EP Search Report for EP Application No. 22940924.8, Sep. 18, 2025.

Lekitsch Bjoern et al: "Blueprint for a microwave trapped ion quantum computer", Science Advances, vol. 3, No. 2, Feb. 3, 2017 (Feb. 3, 2017), XP093310823.

Schulz Stephan A: "Scalable Microchip Ion Traps for Quantum Computation 2009", Sep. 13, 2010 (Sep. 13, 2010), XP093311025.

Kumph Met al: "Operation of a planar-electrode ion-trap array with adjustable RF electrodes", New Journal of Physics, vol. 18, No. 2, Jul. 16, 2015 (Jul. 16, 2015, p. 023047, XP093311032.

* cited by examiner

Figure 13:
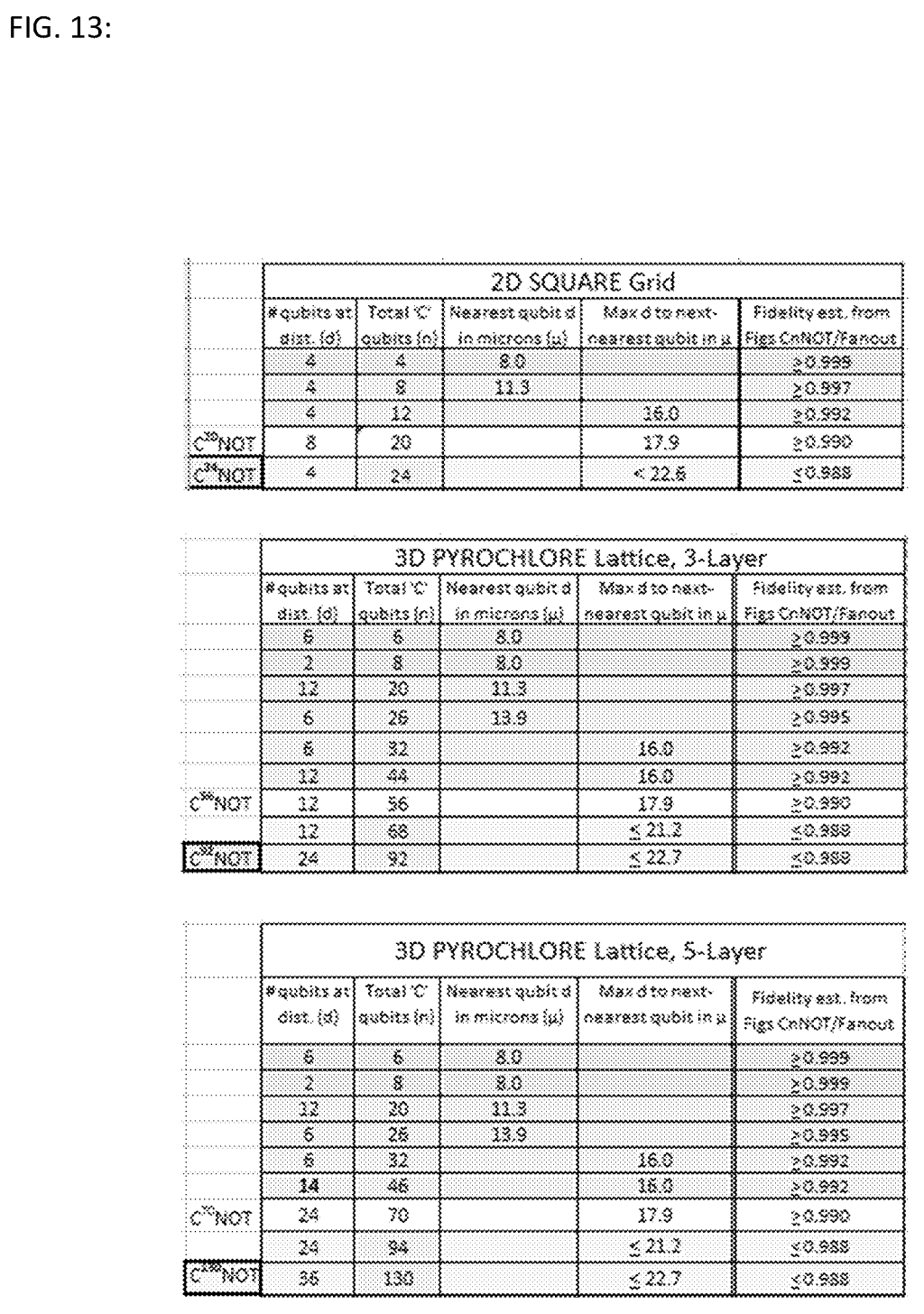

| | # qubits at dist. (d) | Total 'C' qubits (n) | 2D SQUARE Grid | | |
|---|---|---|---|---|---|
| | | | Nearest qubit d in microns (μ) | Max d to next-nearest qubit in μ | Fidelity est. from Figs CnNOT/Fanout |
| | 4 | 4 | 8.0 | | ≥0.999 |
| | 4 | 8 | 11.3 | | ≥0.997 |
| | 4 | 12 | | 16.0 | ≥0.992 |
| C²⁶NOT | 8 | 20 | | 17.9 | ≥0.990 |
| C³⁴NOT | 4 | 24 | | < 22.6 | ≤0.988 |

| | # qubits at dist. (d) | Total 'C' qubits (n) | 3D PYROCHLORE Lattice, 3-Layer | | |
|---|---|---|---|---|---|
| | | | Nearest qubit d in microns (μ) | Max d to next-nearest qubit in μ | Fidelity est. from Figs CnNOT/Fanout |
| | 6 | 6 | 8.0 | | ≥0.999 |
| | 2 | 8 | 8.0 | | ≥0.999 |
| | 12 | 20 | 11.3 | | ≥0.997 |
| | 6 | 26 | 13.9 | | ≥0.995 |
| | 6 | 32 | | 16.0 | ≥0.992 |
| | 12 | 44 | | 16.0 | ≥0.992 |
| C²⁶NOT | 12 | 56 | | 17.9 | ≥0.990 |
| | 12 | 68 | | ≤ 21.3 | ≤0.988 |
| C⁹²NOT | 24 | 92 | | ≤ 22.7 | ≤0.988 |

| | # qubits at dist. (d) | Total 'C' qubits (n) | 3D PYROCHLORE Lattice, 5-Layer | | |
|---|---|---|---|---|---|
| | | | Nearest qubit d in microns (μ) | Max d to next-nearest qubit in μ | Fidelity est. from Figs CnNOT/Fanout |
| | 6 | 6 | 8.0 | | ≥0.999 |
| | 2 | 8 | 8.0 | | ≥0.999 |
| | 12 | 20 | 11.3 | | ≥0.997 |
| | 6 | 26 | 13.9 | | ≥0.995 |
| | 6 | 32 | | 16.0 | ≥0.992 |
| | 14 | 46 | | 16.5 | ≥0.992 |
| C⁷⁰NOT | 24 | 70 | | 17.9 | ≥0.990 |
| | 24 | 94 | | ≤ 21.3 | ≤0.988 |
| C¹³⁰NOT | 36 | 130 | | ≤ 22.7 | ≤0.988 |

SYSTEM AND METHOD USING MULTILAYER OPTICAL LATTICE QUBIT ARRAYS FOR QUANTUM COMPUTING

CROSS REFERENCE TO RELATED APPLICATION

This application claims priority to U.S. Provisional Appl. No. 63/186,037, filed May 7, 2021, and is a continuation-in-part of U.S. patent application Ser. No. 17/090,747, filed Nov. 5, 2020, which claims priority to U.S. Provisional Appl. No. 62/933,148 filed Nov. 8, 2019, and each of these applications is incorporated in its entirety by reference herein.

BACKGROUND

Field

This application is generally directed to quantum computing (QC), and more particularly to quantum computer architectures employing lattice array structures of more than one dimension.

Description of the Related Art

Technology paths toward scalable quantum computing have been diverse. Demonstrated performance in the various figures of merit vary widely according to the type of physical quantum bit (also referred to as a "qubit") employed by each approach. Approaches based on either trapped atomic ions or on superconducting qubits have consistently led the field through more than two decades. Recent advances in trapped Rydberg atomic approaches have increased their viability and importance in the field.

SUMMARY

Certain implementations disclosed herein provide a quantum computer architecture employing a lattice array structure of more than one dimension for implementing and interconnecting quantum gates in which more than two logical qubits (e.g., each logical qubit comprising one or more physical qubits) can be simultaneously entangled. Certain implementations disclosed herein provide quantum microprocessor configuration and gate array design platforms for quantum processing chips, analogous to field programmable gate arrays (FPGAs) which can advantageously provide a degree of reconfigurability. Certain implementations disclosed herein provide quantum microprocessor configuration and gate array design platforms for quantum processing chips or boards (e.g., electrical and/or optical circuits; integrated optical lattices), analogous to application specific integrated circuits (ASICs) which can advantageously be optimized for a specified application and can advantageously provide custom design flexibility.

Certain implementations disclosed herein provide a quantum computing (QC) system comprising a plurality of qubits arranged substantially in a plurality of substantially planar regions (e.g., planes; layers) that are substantially parallel to one another, at least some of the substantially planar regions comprising two or more qubits and one or more qubits of each substantially planar region configured to interact with one or more qubits of at least one neighboring substantially planar region. For example, the QC system can comprise a plurality of 2-D lattice layers (e.g., atomic; photonic), the lattice layers substantially parallel to each other, and the QC system can comprise a multiple-qubit gate array comprising the plurality of qubits arranged as a plurality of multiple-qubit gates positioned in a region spanning multiple lattice layers. The multiple-qubit gate array can comprise lattices configured to contain and/or selectively address neutral (e.g., uncharged) atoms, Rydberg atoms, and/or other qubits confined in multilayer lattice arrays, such as nitrogen-vacancy or NV centers (e.g., engineered in diamond or other crystal), arrays of trapped Bose-Einstein condensates (BECs), and others. In certain such examples, these substantially parallel lattice array layers can be arranged substantially in a plurality of substantially planar regions (e.g., planes; levels), with at least some of the qubits of at least one substantially planar region configured to interact (e.g., to be quantum-mechanically entangled) with at least some of the qubits of at least one other (e.g., neighboring) substantially planar region.

Certain implementations disclosed herein comprise lattice configurations comprising multiple fully-connected qubits arranged as arrays of three-dimensional (3-D) lattice structures (e.g., to form gates), with simultaneous multi-qubit gate operations enabled by qubits arrayed in geometric layouts. Certain implementations disclosed herein address a common set of key challenges to building an optimally efficient quantum computer. Principal among these challenges is how to engineer implementable geometric structures of qubits in which maximum numbers of nearest neighbor, next nearest neighbor, next-next nearest neighbor, etc. qubits can be simultaneously entangled to effect up to many-qubit quantum gate operations natively, or geometrically within a single gate operation (see, e.g., U.S. Provisional Appl. No. 63/186,037 filed May 7, 2021; U.S. patent application Ser. No. 17/090,747 filed on Nov. 5, 2020; U.S. Provisional Appl. No. 62/933,148 filed on Nov. 8, 2019, each of which is incorporated in its entirety by reference herein).

In certain implementations, a quantum computing (QC) system comprises a first plurality of logical qubits in a first substantially planar region and a second plurality of logical qubits in a second substantially planar region that is substantially parallel to the first substantially planar region. At least some of the first plurality of logical qubits are configured to interact with one another, and at least some of the second plurality of logical qubits are configured to interact with one another and to interact with the at least some of the first plurality of logical qubits. In certain implementations, the QC system comprises additional pluralities of logical qubits in additional substantially planar regions that are substantially parallel to the first and second substantially planar regions and at least some of the second plurality of logical qubits are configured to interact with one or more of the additional pluralities of logical qubits.

In certain implementations, a quantum computing (QC) system comprises a plurality of confinement regions configured to contain logical qubits forming quantum gates in a multilayer qubit lattice array comprising more than two dimensions. The quantum gates are configured to perform quantum logic operations involving three or more logical qubits natively without reliance on concatenations of one- and two-qubit gates.

BRIEF DESCRIPTION OF THE DRAWINGS

The accompanying drawings, which are incorporated in and constitute a part of this specification, illustrate one or more implementations described herein and, together with the description, explain these implementations.

FIG. 13 shows three tables comparing the total number of qubits that can be entangled simultaneously at given gate fidelities for various multilayer qubit lattice arrays in accordance with certain implementations described herein.

DETAILED DESCRIPTION

Overview

Figure 1:
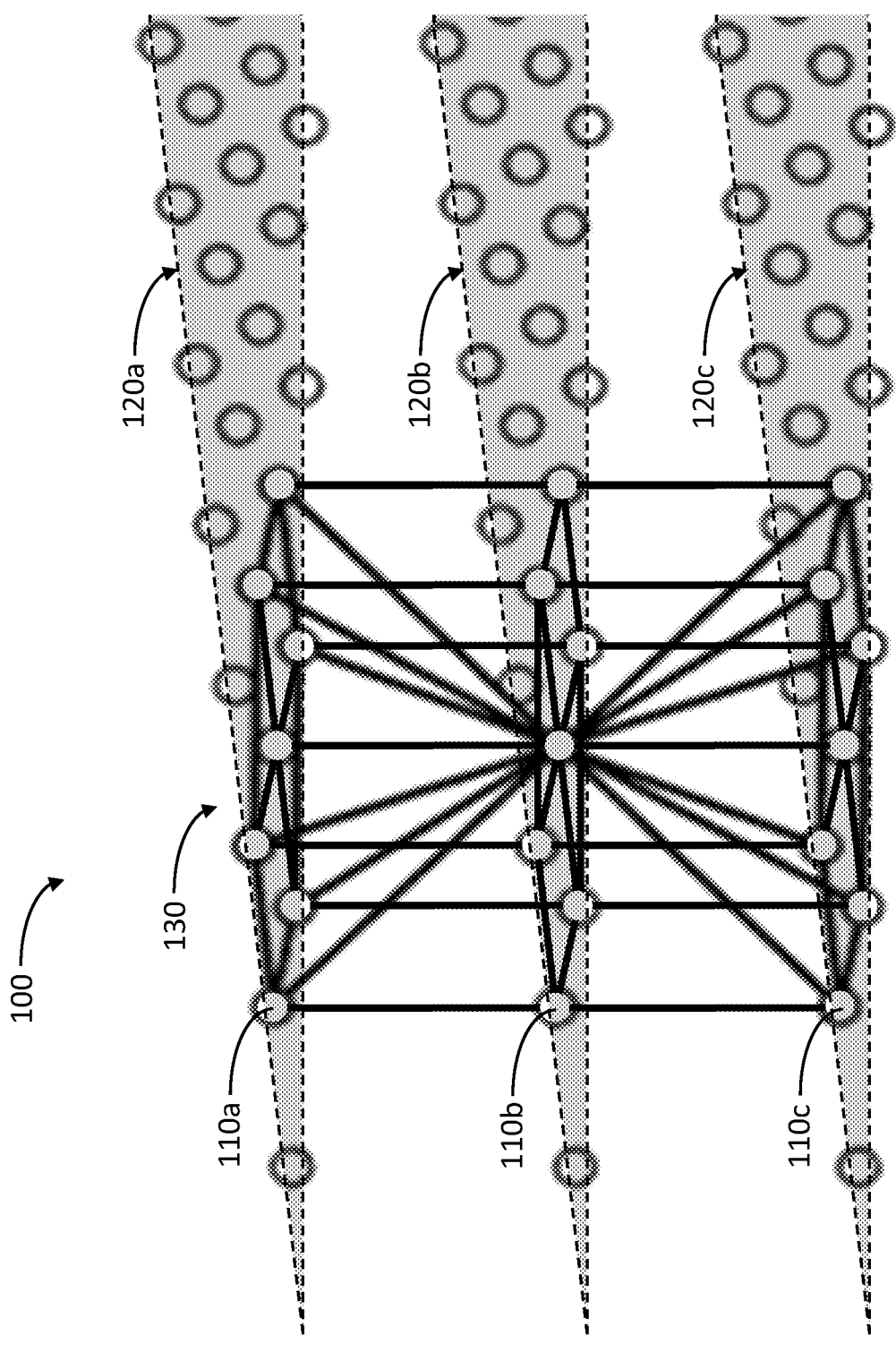
FIG. 1 schematically illustrates a perspective view of an example quantum computing (QC) system comprising logical qubits in substantially planar regions in accordance with certain implementations described herein.

Certain implementations disclosed herein comprise lattice configurations comprising multiple fully-connected qubits arranged as arrays of three-dimensional (3-D) lattice structures (e.g., cells), with simultaneous multi-qubit gate operations enabled by qubits arrayed in geometric layouts. Certain implementations disclosed herein advantageously add to the number of lattice layers and increase the number of qubits that can be entangled simultaneously over the limits currently achievable (e.g., with acceptable gate fidelities) using current square-based photonic lattices for Rydberg atoms, and potentially over qubit densities achievable in the hexagonal multilayer surface-trap geometries for ions.

Certain implementations disclosed herein address challenges to building an optimally efficient quantum computer. One such challenge is how to engineer implementable geometric structures of qubits in which maximum numbers of nearest neighbor, next-nearest neighbor, next-next-nearest neighbor, etc. qubits can be simultaneously entangled to provide many-qubit quantum gate operations natively (e.g., geometrically within a single gate operation). This engineering challenge comprises two coequal parts. One part is how to confine (e.g., trap; engineer crystal lattice site locations of) the qubits in optimal entangling geometries. Such confinement generally entails engineering complex intersections of several lasers along with precise periodic location of defect sites in crystals, electrodes, and/or magnetic fields. The other part of the engineering challenge is how to address (e.g., illuminate; excite; manipulate) and read out (e.g., detect; image) the qubits as selectively as possible (e.g., individually). This addressing can go beyond the creation of entanglement simultaneously between as many qubits as possible, which can often be done with global addressing. Rather, exploiting the full computational power of a number of entangled qubits can also include manipulating and reading out individual qubit states of a desired multiqubit gate operation, which utilizes the ability to address each qubit individually as needed. This ability can be critically important because the intrinsic computational power of each quantum computing gate is exponential in (e.g., proportional to 2 to the power of) the number of qubits of simultaneously entangled qubits that can fully participate as logical qubits in each gate operation. In addition, overhead (e.g., error correcting qubits; redundant qubits; ancilla qubits) is to be factored in, which grows dramatically (e.g., by orders of magnitude) as the size of quantum computing architectures increases to scales where surface codes are utilized to correct the errors of very large numbers of qubits. Therefore, the total advantage of entangling more individually addressable (e.g., logical) qubits simultaneously in gate cells up front can greatly surpass even the initial exponential speedup indicated above by further greatly reducing or precluding the use of orders of magnitude of added overhead that surface-code error correction entails.

Certain implementations disclosed herein can be configured as multiple two-dimensional (2-D) (e.g., planar) qubit arrays (e.g., layers) that are substantially parallel to one another and that form arrays of three-dimensional (3-D) cells. The arrays of cells can be analogized to or referred to as 3-D crystal lattices. While various implementations are described herein as utilizing trapped neutral (e.g., uncharged) atom qubits or Rydberg atom qubits in optical lattice structures (see, e.g., I. Bloch, "Quantum coherence and entanglement with ultracold atoms in optical lattices," Nature 453, 1016 (2008)) to illustrate the nature of quantum interactions to be utilized (e.g., optimized), other implementations can use one or more alternative qubit technologies in lattice structures (e.g., qubits trapped in natural crystal lattices; artificially formed crystal structures) that are equivalent both in structure and in function (e.g., can form extensions of pyrochlore-like structures that enable maximum numbers of nearest neighbor, next-nearest neighbor, next-next-nearest neighbor, etc. qubits to be simultaneously entangled to provide within a single gate what has previously been provided by concatenations of hundreds or thousands of one- and two-qubit quantum gate operations).

One example alternative technology of atomic vacancy centers in crystals (e.g., nitrogen-vacancy centers, hereafter, simply "NV centers" in diamond) recently has also progressed in terms of fidelity, coherence time, full-connectivity between up to 10 qubits and multipartite entangled states with up to 7 qubits (see, e.g., C. E. Bradley et al., "A 10-qubit solid-state spin register with quantum memory up to one minute," Phys. Rev. X 9, 031045 (2019)). Such properties, along with the atom-like properties, that NV centers exhibit make them one more example of qubit technology that can be directly applied to certain implementations described herein, such as substantially equivalent solutions to the problem of forming 3-D lattices that enable both entanglement of maximum numbers of qubits simultaneously and optimal geometric accesses for addressing (e.g., initializing, performing gate operations on, and reading out the value of) qubits individually in multilayer optical lattices. Still other implementations can use other alternative qubit technologies, for example, trapped Bose-Einstein condensates (BECs); neutral molecules; phonons; photons; and others.

Certain implementations of the quantum computing (QC) system described herein advantageously provide a multi-layer architecture to enable optimal numbers of qubits to be entangled simultaneously between nearest neighbors, next-nearest neighbors, and next-next-nearest neighbors, and potentially beyond. Certain implementations include geometries configured to enable optimal combinations of electrical, magnetic, and optical addressing, control, detection, and readout as are needed to engineer scalable quantum processors. Arrays of qubits that are fully connected provide more efficient, flexible choices for executing quantum algorithms in hardware than designs in which entangled gate operations are limited to specific pairs, due to type of qubit employed or their layout. This improved efficiency and flexibility grows rapidly with the number of qubits in an array. Adding a capability to perform gate operations involving more than two qubits at a time can significantly accelerate the efficiency gains over designs limited to one- and two-qubit gates, tens of which can be replaced with one four-qubit gate. Certain implementations described herein use multiple qubit arrays (e.g., multiple directly-connected planar lattices) to advantageously avoid problems of one- and two-dimensional geometry configurations (e.g., limits on connectivity; crowding of components needed to control each qubit in an increasingly dense gate array when limited to only two dimensions). In certain implementations, multi-dimensional cells of qubits are formed that resemble crystals, such as pyrochlores. In certain implementations, multi-dimensional cells of qubits are reconfigurable and can be formed into various crystal structures according to which nearest neighbor, next-nearest-neighbor qubits (e.g., within a cell; across cells; across layers) and beyond are simultaneously entangled for a selected gate operation. Utilizing many qubits to participate per gate can also reduce requirements of circuit depth, error correction and interference mitigation. Reconfigurable component cells can enable quantum FPGA (QFPGA) and ASIC (QASIC) layout (e.g., chips).

Certain implementations of the QC system described herein comprise multi-layer configurations comprising multiple fully-connected qubits arranged as arrays of three-dimensional (3-D) lattice structures (e.g., cells) with simultaneous multi-qubit gate operations enabled by qubits arrayed in geometric layouts. For example, multiple planar qubit arrays in layers (e.g., rows and columns; lattice) can be substantially parallel to one another and can form arrays of 3-D cells that can be analogized to or referred to as crystal structures. In certain implementations, the qubits can be localized (e.g., trapped; suspended; confined) within multiple qubit lattice containment zones (e.g., parallel neutral-atom trap arrays; NV centers) to enable optimal coherent connectivity (e.g., entanglement) directly between nearest neighbor qubits, next-nearest neighbor qubits, etc. across multiple substantially planar array regions (e.g., layers; levels; planes) without requiring inefficient photonic or other interconnects (e.g., quantum teleportation) entailing lossy conversions of in situ processing qubits to other species or data bits or significant time delays. Certain such implementations utilize geometrically symmetric cellular structures that provide the capability to perform gate operations involving more than two qubits at a time that can significantly accelerate the efficiency gains over designs limited to one- and two-qubit gates. Certain other implementations can be configured as multiple two-dimensional (2-D) qubit lattice arrays (e.g., planar lattices; grids; rows and columns) that are substantially parallel to one another to enable 3-D structures to be formed between multiple 2-D layers.

While various implementations are described herein according to the physics of neutral atom (e.g., uncharged atom, Rydberg atom) qubit approaches, other qubit approaches (e.g., NV centers; superconducting qubits; others cited herein) can also be used in accordance with certain implementations described herein without loss of generality.

Certain implementations of the QC system described herein comprise a plurality of multiple-qubit three dimensional (3-D) gate cells, each cell comprising at least three qubits that can be fully connected simultaneously across three dimensions, and a plurality of multiple-qubit cells configured for gate operations of two or more of the multiple-qubit gates. The QC system of certain such implementations can comprise multiple substantially parallel qubit containment lattices, such as parallel neutral atom trap arrays, that enable optimal coherent connectivity or entanglement directly between nearest neighbor qubits, next-nearest neighbor qubits, etc. across multiple array layers, levels or planes without requiring conversion to and from photonic qubits or other inefficient interconnects (e.g., interconnects that impart significant losses and/or time delays). The multiple-qubit cells can be configured using geometric symmetry to enable multiple-qubit gates to be effected natively, in one gate operation, without reliance on concatenations of multiple one- and two-qubit gates. Leveraging the symmetry of equilateral coupling distances between multiple qubits in a cell enables more than two entangled qubits at a time to perform gate operations that would otherwise require many more qubit gate operations comprising only one- and two-qubit gates.

Certain other implementations disclosed herein provide a QC system comprising a plurality of qubits arranged substantially in a plurality of 2-D array layers (e.g., 2-D lattices; planes; grids) that are substantially parallel to one another, at least some of the 2-D array layers comprising two or more qubits and one or more qubits of each array layer configured to interact with one or more qubits of at least one neighboring 2-D array layer. The QC system can comprise a plurality of atom trap layers (e.g., 2-D optical lattice traps) substantially parallel to one another, and the QC system can further comprise multiple-qubit, 3-D gate arrays comprising the plurality of qubits arranged as a plurality of multiple-qubit gates positioned in regions between and/or within the trap layers. For example, the qubits of the multiple-qubit gate array can comprise 2-D trap arrays configured to contain atomic qubits comprising neutral atoms (e.g., uncharged atoms, Rydberg states), NV centers, or other qubit species. For the examples of Rydberg atoms, NV centers, and other atomic qubits species, qubits are confined in lattices (e.g., trapped in potential wells; in atomic vacancy centers), which can be created by optical-beam (e.g., laser) lattices, and can be arranged substantially in a plurality of substantially parallel trap array layers (e.g., lattices; levels;

planes), with at least some of the qubits of at least one 2-D trap array layer configured to interact (e.g., to be quantum-mechanically entangled) directly with at least some of the qubits of at least one other (e.g., neighboring) substantially parallel trap array layer.

In each of the implementations of the QC system described herein the symmetric or equilateral coupling geometries of the multiple qubits per cell can enable more complex quantum gates to be performed in a single gate operation and can additionally reduce requirements of circuit depth, error correction and interference mitigation. The interchangeable component cells can enable quantum FPGA (QFPGA) and ASIC (QASIC) layout (e.g., chips) and can be highly reconfigurable.

Certain implementations of the QC system described herein advantageously provide a three-dimensional (3-D) layout of qubits and/or qubit gates that facilitate many more qubits and/or qubit gates being used for computations than are provided using one-dimensional (1-D) layouts or two-dimensional (2-D) layouts (e.g., J. I. Cirac and P. Zoller, "A scalable quantum computer with ions in an array of microtraps," Nature, Vol. 404, p. 579 (2000); J. Chiaverini et al., Quant. Inf. Comp. Vol. 5, 419 (2005)). For example, certain implementations described herein provide a 3-D layout of qubit gates, each comprising multiple atomic qubits (e.g., three or more simultaneously entangled neutral atoms, charged atoms, NV center qubits, etc.), while providing sufficient spacing to facilitate electrical connections and optical pathways for addressing, manipulation, control, readout, and potential sideband cooling of each qubit, and providing line of sight access angles.

When a particular arrangement or set of qubits allows for any qubit to be quantum mechanically entangled directly with any other qubit in the set, the qubits can be described as being "fully connected." For example, even a small number of qubits comprising ions (e.g., charged atoms) that are fully connected in a one-dimensional (1-D) linear atom trap can demonstrate measurably greater potential processing power than can the same number of qubits that are only pair-wise connected (see, e.g., N. M. Linke et al., "Experimental comparison of two quantum computing architectures", PNAS, Vol. 114, no. 13 (2017)).

Quantum computing (QC) designs demonstrated over the past two decades indicate that the parameters which most affect how quickly a quantum computer can outperform its classical computer counterpart are not based simply on how many qubits are wired together in some fashion. Demonstrated performance of such systems has come down to qubit fidelities (e.g., how precisely the system can perform gate operations), how the qubits are interconnected, and how much overhead is used to allow the qubits to work together to compute solutions to hard problems.

One-qubit gates simply entail flipping a qubit by itself from "0" to "1" or to a special quantum superposition of "0" and "1". Two-qubit gates connect two qubits using superposition combined with quantum entanglement such that anything done to one of the qubits affects the other. In such a two-qubit gate, a target qubit may start out in state "0" or state "1" and can be in any superposition of "0" and "1" (e.g., halfway between "0" and "1"). For example, the function of a quantum controlled-NOT (CNOT) gate is to flip the target qubit if the control qubit is in state "1"; otherwise it does nothing. One- or two-qubit gates can be implemented directly in many different quantum gate-based architectures. For more complex gate operations, implementations that can entangle more than two qubits at once can have a significant impact on the total number of qubits and steps performed to effect the operation and the algorithms that incorporate them (see, e.g., C. Figgatt et al., "Parallel entangling operations on a universal ion-trap quantum computer," Nature, Vol. 571 (2019); Y. Lu et al., "Global entangling gates on arbitrary qubits," Nature, Vol. 571 (2019)). Measurable reductions in the numbers of qubits and steps used up front can, in some instances, lead to dramatic reductions in the overhead for achieving successful outcomes. One example would be a prototype demonstration that could give solutions to otherwise intractable problems without extensive error correction and with fewer ancillas, even part of the time.

Certain implementations described herein use multiple fully connected, high-fidelity qubits. The advantages of such certain implementations (e.g., how much more efficient a particular quantum gate operation can be, as opposed to using combinations of one- and two-qubit gates) can be illustrated by considering an example quantum triply-controlled-NOT ($C^3$NOT) gate comprising four fully connected, high-fidelity qubits. The $C^3$NOT gate is also called a super-Toffoli gate. In this example $C^3$NOT gate, three control qubits must all be in a specified state (e.g., "1,1,1") in order to flip a fourth target qubit from "1" to 0". When combined with one or more single-qubit gate operations, such multi-qubit quantum gates can be used to complete a universal set for quantum computing. Multiply-controlled NOT gates are described in reference sources generally as comprising extended series of one- and two-qubit gate operations (see, e.g., M. A. Nielsen and I. L. Chuang, "Quantum Computing and Quantum Information," 1st ed. (Cambridge Univ. Press, 2000)). The extent to which these one- and two-qubit gate series increase even more in physical implementations depends on type of qubits used and on how many qubits can be fully connected and entangled with one another. However, a $C^3$NOT gate implemented using four fully-connected, multiply-entangled ions at the same time, in an appropriate physical layout, can be configured with a small fraction of the number of the quantum gate operations used in a $C^3$NOT gate implemented only with one- and two-qubit gates. Methods for implementing the simpler $C^2$NOT Toffoli gate were first described using trapped ions (see, e.g., J. I. Cirac and P. Zoller, "Quantum Computations with Cold Trapped Ions," Phys. Rev. Lett. Vol. 74 (20) (1995)) and later demonstrated (see, e.g., T. Monz et al., "Realization of the Quantum Toffoli gate with Trapped Ions," Phys. Rev. Lett. Vol. 102, 040501 (2009)). The three-qubit $C^2$NOT implementation already exhibited a significant reduction in number of contributing gates and time required to complete the full gate operation, while yielding an improvement in net fidelity over the concatenation of one- and two-qubit gates, even if they were of much higher individual fidelities, due to aggregated gate errors. This three-qubit gate could be realized in a linear trap without a strong requirement for geometric symmetry. In contrast, certain implementations described herein provide C"NOT gates by exploiting the full 3-D symmetries of the designs described herein. In this way, the improved efficiency example referenced above can be greatly multiplied according to the number of controls in each C"NOT gate through concomitant reductions in quantum gates needed to implement them. Other multiply-controlled gate operations, including phase rotations, can exhibit similar improvements in efficiency using a physical configuration that involves more than two entangled qubits simultaneously. These improvements up front can greatly reduce error correction.

Even the highest quality qubits exhibit noticeable error rates, which can be small on a per-qubit basis but get multiplied by the number of gates that are used to run an algorithm. When the aggregate error rate reaches a threshold where error correction is required to perform even a small set of quantum operations with reasonable chance of giving a reliable result, the efficiency of the architecture immediately drops in proportion to the amount of overhead used for the error correction.

For a small scale quantum computer having a few hundred relatively high quality qubits intended to perform logic operations, the overhead of error-correction qubits plus ancillas can represent an increase in the number of qubits of one order of magnitude or roughly a factor of ten, with a proportionate decrease in efficiency. For larger scale systems, the overhead can increase further to multiple orders of magnitude. However, in certain implementations described herein, a quantum computer that benefits from aggregate efficiencies of fully-connected, high-quality qubits and employs multi-qubit gate operations (e.g., performed natively by exploiting multi-dimensional geometry) can use significantly fewer steps and significantly fewer total numbers of qubits. As used herein, the term "native" gate operations indicates that more than two qubits can participate at the same time, by virtue of a geometric layout. Certain native multi-qubit gate implementations described herein can advantageously perform algorithms without using extensive error correction overhead. In addition, significant improvements in overall design efficiency, due to reduced overhead, can be achieved, using multiple orders of magnitude fewer quantum resources, both to perform basic quantum computing algorithms or subroutines and to show practical utility with increased speed as compared to classical computing systems.

To date, most QC systems using atomic qubits have employed one-dimensional (e.g., linear) traps, which can then be interconnected electrically or photonically (see, e.g., U.S. Pat. No. 9,858,531; Debnath et al., "Demonstration of a small programmable quantum computer with atomic qubits," Nature, Vol. 536, p. 63 (2016)). Most such 1-D traps enable a linear chain of qubits to be fully connected within a common potential well or trapping zone. The extent of full connectivity is limited by how many qubits can be chained together before the coupling strength between qubits at or near opposite endpoints of the linear chain is too weak to be usable for reliable multi-qubit gate operations, so it can be desirable to create interconnects between multiple linear traps of limited lengths. Optical interconnects, for example, can be employed by transferring a qubit state from an atomic qubit to a photon, then sending the photon to another linear trap where the quantum state is transferred to another atom. One type of protocol that is commonly used for such a process is termed "quantum teleportation." Such interconnections impart time delays and potential inefficiencies in the conversions (e.g., from an atomic qubit to a photon, and to a second atom). Certain implementations described herein advantageously provide an alternate configuration to optimize more direct qubit-to-qubit interactions simultaneously than can be done efficiently using linear or 2-D elements with optical interconnects. When scaling up to larger numbers of qubits, certain such implementations can advantageously reduce or stave off the number of optical interconnections between nodes with their associated penalties (e.g., time delays; ion-photon conversion losses).

Rectangular two-dimensional (2-D) grid configurations have been previously adopted for some trapped ion approaches, and superconducting qubit (SCQ) schemes. In such 2-D grid approaches, the interactions between the qubits generally have been limited to one- and two-qubit operations that occur within the trapped ion grid lanes (e.g., by shuttling qubits in and out of lanes through intersections), and usually rely on significant redundancy to add the degree of fault tolerance for raising the probability of success in running an algorithm to usable levels. For example, some approaches use global addressing of ensembles of qubits, which are shuttled in and out of aligned intersections in a grid in order to effect a single one- or two-qubit operation redundantly among the many qubits, and then average to reduce errors. The overhead in such an approach, in terms of numbers of redundant qubits for effecting a single logic operation with sufficient fidelity, grows rapidly with the scale of the logic operations to be performed by the quantum computer. Conversely, in certain implementations described herein, entanglement between more than two qubits is enabled by having the qubits arranged in two or more dimensions, to be involved simultaneously and to effect multi-qubit gate operations directly or natively.

Other 2-D lattice approaches that have been proposed and/or adopted include using neutral atoms, initially applying Rydberg-blockade methods (see e.g., M. Saffman et al., "Quantum information with Rydberg atoms," Rev. Mod. Phys. 82, 2313 (2010); K. Maller et al., "Rydberg-blockade controlled-not gate and entanglement in a two-dimensional array of neutral-atom qubits," Phys. Rev. A 92, 022336 (2015)). The fidelity of earlier Rydberg-blockade methods was not competitive for forming quantum gates for computing, however these Rydberg-blockade methods have since been surpassed by improved methods of entangling Rydberg atoms (see e.g., D. Petrosyan et al., "High-fidelity Rydberg quantum gate via a two-atom dark state," Phys. Rev. A 96, 042306 (2017); M. Khazali and K. Molmer, "Fast Multiqubit Gates by Adiabatic Evolution in Interacting Excited-State Manifolds of Rydberg Atoms and Superconducting Circuits," Phys. Rev. X 10, 021054 (2020)).

To distinguish certain implementations described herein from other approaches in which descriptive terms and visual layouts may appear similar, it is noted that the overall layout of 2-D periodic crystal structures, such as regular geometric lattice traps have been formed in ways that are useful for studying the physics of many-body interactions yet not for implementing gate operations between multiple qubits. For example, triangular ion traps (e.g., Penning traps) can be formed as a surface of periodic electropotential wells into which ions can be placed to form an extended 2-D crystal or triangular lattice that can be used for certain types of quantum simulators. These traps can be used to form energy topologies that mimic those of the quantum system to be modeled (e.g., to find the lowest electron energy configuration of a given molecule). Similarly, tetrahedral, hexagonal Kitaev models (see, e.g., A. Kitaev, "Anyons in an exactly solved model and beyond," Ann. Phys. Vol. 321, 2 (2006); R. Schmied et al. "Quantum simulation of the hexagonal Kitaev model with trapped ions," New J. Phys. 13 115011 (2011)); hybrid lattices; kagome optical lattices (see, e.g., R. Samajdar, "Quantum phases of Rydberg atoms on a kagome lattice," Proc. Natl. Acad. Sci. U.S.A. 118, e2015785118 (2021)) and other regular lattice structures can resemble, but are fundamentally different in design complexity and purpose from certain implementations described herein. For example, whereas such crystal lattice structures have been designed for simulations of quantum systems, such structures are generally not intended to perform gate operations. In particular, a quantum simulator having a 2-D hexagonal lattice of ions (e.g., following the Kitaev model) or neutral atoms (e.g., in an optical kagome lattice) in accordance with certain implementations described herein generally can use much simpler qubit control, addressing, and readout schemes with fewer lasers (e.g., global addressing instead of individually addressing lasers), simpler detection schemes, fewer electrode structures, etc. than the complexity and number of such structures of a "full-up" quantum computer capable of quantum gate operations.

Certain implementations described herein advantageously facilitate solutions to hardware challenges that can grow rapidly and appear daunting or infeasible when designing gate-model QC structures that are scaled up from 2-D trapped atom lattices. For example, certain implementations described herein integrate optical elements (e.g., lasers; optical ports; fibers; detectors) into the QC structure for addressing, manipulation, readout, and potential sideband trapping and/or cooling of each qubit, and provide line of sight access angles.

Certain implementations described herein advantageously provide scalable hardware configurations on which it is possible to directly "write" and run complex quantum algorithms by enabling simultaneous entanglement between optimal numbers of neighboring qubits. In certain implementations, a multidimensional quantum gate implementation, analogous to conventional firmware such as a field programmable gate array (FPGA), can be written directly in the form of multi-qubit gates and reprogrammed flexibly.

Certain implementations described herein advantageously enable multiply controlled quantum gate operations to be run natively by exploiting multi-dimensional geometry. In certain implementations, the quantum gate operations are run on a quantum firmware platform in the least number of steps (e.g., without resorting to concatenations of one- and two-qubit gate operations to effect a multiply controlled NOT operation).

Certain implementations described herein advantageously provide a realizable engineering configuration that enables the quantum firmware platform to be scaled up as needed by integrating electrical and optical accesses for full control and readout of each qubit in a circuit-model architecture to enable universal quantum computing.

Certain implementations described herein advantageously provide a multi-layer quantum computing structure configured to enable optimal numbers of qubits to be entangled simultaneously between nearest neighbors, next-nearest neighbors, next-next-nearest neighbors, and beyond. Certain such implementations include electrical channels and optical accesses for addressing, control, and readout of qubits in scalable quantum processors. For example, arrays of qubits that are fully connected advantageously provide more efficient, flexible choices for executing quantum algorithms in hardware than do other designs in which entangled gate operations are limited to specific pairs (e.g., due to the type of qubit employed or their layout). This improved efficiency and flexibility can grow rapidly with the number of qubits in an array.

Certain implementations described herein are advantageously able to perform gate operations involving more than two qubits at a time, thereby providing significant improvements of efficiency over previous designs that are limited to one- and two-qubit gates (e.g., by replacing tens of such gates with one four-qubit gate). Certain implementations described herein advantageously overcome connectivity limitations found in one- and two-dimensional qubit geometries (e.g., linearly trapped ions; ions trapped in 2-D grids, NV centers in 2-D diamond lattices; other 1-D and 2-D qubit lattices). For example, arraying qubits in multiple qubit arrays (e.g., multiple planar and/or linear qubit arrays) with direct connectivity (e.g., entanglement) between the qubit arrays can solve the problem of significant time delays and inefficiencies of converting from ion qubits to photonic qubits and back again to continue scaling up from tens of atoms in a 1-D chain or a 2-D grid.

Certain implementations described herein advantageously provide multi-dimensional entangling geometries that resemble complex 3-D crystal structures (e.g., pyrochlores). In addition, specific, unobstructed lines of sight designed into certain implementations advantageously provides optical accesses from multiple angles for addressing each atomic qubit individually and uniquely as well as ensembles of the qubits globally. Certain implementations advantageously provide multiple optical accesses for readout of individual atomic qubit states by detectors.

Certain implementations described herein advantageously utilize neutral atom qubits (e.g., uncharged Rydberg atoms in which an outer electron is elevated to a highly excited state) to form multilayer qubit lattice arrays, which both demonstrates the applicability of this system and methods to alternative qubit types and helps further illustrate the processing potential. Recently improved techniques for entangling Rydberg atoms make them increasingly viable for quantum computing (see e.g., M. Khazali and K. Molmer (2020); D. Petrosyan et al. (2017)). As a result of the improved techniques Rydberg atoms are also well suited to serve as another example qubit for the system and methods described herein. Techniques for forming Rydberg qubit lattices can include crossing coherent light beams (e.g., lasers) and creating electromagnetic field interactions with the optical sidebands to form energy potential wells, either within intersecting optical beams (e.g., in potential wells formed by red sidebands) or in spaces (e.g., cells) between the light beams (e.g., in potential wells formed by blue sidebands) to trap individual neutral atom qubits, analogous to using electro-potential to trap ion qubits, with many of the same benefits of trapped ion lattice arrays and some specific advantages. For example, although Rydberg qubits have yet to demonstrate the highest qubit gate fidelities and longest lifetimes associated with trapped ions, Rydberg atoms can be configured into hexagonal lattice layers to create crystalline geometries (e.g., pyrochlore structures) equivalent to and/or continuations of those described in U.S. Pat. Appl. Publ. No. 2021/0142204 A1 using ion qubits as primary examples. The photonic lattice structures utilized to trap the Rydberg atoms can enable very close qubit spacing and additional array layers in accordance with certain implementations described herein.

Certain implementations described herein advantageously utilize Rydberg atoms in qubit arrays of multilayer lattice structures in geometries equivalent to those described in U.S. Pat. Appl. Publ. No. 2021/0142204 Al (e.g., using primarily charged-atom qubit examples), with the potential to add to the number of lattice layers and to increase the number of qubits that can be entangled simultaneously over the limits currently achievable (e.g., with acceptable gate fidelities) using current square-based photonic lattices for Rydberg atoms, and potentially over qubit densities achievable in the hexagonal multilayer surface-trap geometries described herein for ions. Data from recent experiments in trapping neutral Rydberg atoms in small scale linear and/or square arrays indicate that on order of 20 qubits can be entangled simultaneously in a 2-D square lattice at multiqubit gate fidelities sufficient for scalable fault-tolerant quantum computing (see e.g., M. Khazali and K. Molmer (2020)).

By integrating multiple-axis arrays of coherent photonic (e.g., laser) beams into 3-D optical trap lattices and adjusting the 3-D lattice cell shapes and spacing to optimize the number and fidelity of entangling operations between qubits across the maximum number of cells in multiple directions, certain implementations described herein advantageously provide multi-dimensional entangling geometries equivalent to those of charged atomic qubits (e.g., ions) and resembling 3-D crystal structures (e.g., a pyrochlore) of equal, and in some cases increased, complexity and processing power. For example, certain implementations described herein utilize Rydberg atoms in photonic multilayer qubit lattice arrays that advantageously enable minimized inter-qubit spacing (e.g., to less than 10 microns in a photonic trap lattice). Certain implementations described herein incorporate hexagonal multilayer lattices arrays equivalent to those described herein for ions to enable full connectivity of more than 12 simultaneously entangled qubits while enabling the addition of lattice layers (e.g., to 3, 4, 5 or more layers). These example implementations can yield the ability to entangle more qubits simultaneously. Since processing power increases exponentially with the number of qubits of substantially equivalent fidelities that can be entangled simultaneously, increasing this number from say, 12 entangled atomic qubits to 42 qubits, for a difference of 30 qubits translates to a computing power increase of $2^{30}$ or over a billion-fold advantage.

Example Implementations

Certain implementations described herein utilize multidimensional configurations (e.g., cells; nodes) of qubits, which can resemble 3-D crystal structures (e.g., pyrochlores). Certain implementations utilize many qubits per gate, advantageously reducing (e.g., minimizing) circuit depth, error correction, and interference mitigation. Certain implementations utilize interchangeable component cells which can advantageously enable quantum FPGA (QFPGA) and quantum ASIC (QASIC) chips.

While the physical configurations of certain implementations are described herein as using high fidelity trapped atom qubits (e.g., with low error rates), any type of qubit (e.g., naturally occurring; artificially formed) that can be entangled in multiple dimensions simultaneously with multiple other qubits can be used in accordance with certain implementations described herein. Examples of qubits compatible with certain implementations described herein include but are not limited to: subatomic particles; neutral atoms; ions; neutral molecules; charged molecules; Bose-Einstein condensates (BECs); electrons; electron holes; excitons; magnetic qubits; nitrogen-vacancy (NV) centers (e.g., in diamond); phonons; photons; quantum dots; Rydberg atoms; spins in silicon; and possibly superconducting qubits. In certain implementations, the qubits are suitable to effect gate operations directly (e.g., natively), between more than two qubits in the specified configuration. For example, the physical architecture of certain implementations can advantageously provide complex gate operations directly, such as a multiply-controlled NOT or phase rotation, without resorting to serial concatenations of one- and two-qubit gates.

The trapped atom qubits utilized in certain implementations described herein, illustrate the nature of quantum interactions to be optimized. Germane figures of merit that trapped atoms exhibit include but are not limited to: (i) the fact that they are identical within a given species and therefore extensive calibration or tuning can advantageously be avoided, (ii) the ability to form qubits that have good stability and coherence times relative to their potential gate cycle times, and (iii) continued, demonstrated high fidelity gate operations as compared to competing qubit technologies. In certain implementations described herein, simultaneous multi-qubit gate operations can be enabled by atoms arrayed in 3-D geometric layouts of multiple identical, fully-connected qubits. In certain implementations, 3-D geometric layouts of fully-connected qubits can advantageously integrate more than one qubit type (e.g., employ atoms of one species for the multiple control qubits and a second atomic species as a target; employ different atomic species for neighboring cells).

Certain implementations described herein comprise multilayer qubit arrays utilizing various qubit technologies, including but not limited to: naturally occurring atoms; neutral atoms; charged atoms; ions; molecules; artificially formed atoms; Rydberg atoms; nitrogen-vacancy (NV) centers in diamond; Bose-Einstein condensates (BECs); electrons; photons; quantum particles; quantum dots; phonons; transmons; quantum states that behave as quantum particles. While the figures herein depict various example multilayer qubit arrays comprising uncharged atoms (e.g., neutral atoms; Rydberg states; neutral Rydberg atoms), it is understood that these example multilayer qubit arrays are compatible with other qubit technologies as well.

FIG. 1 schematically illustrates a perspective view of an example quantum computing (QC) system 100 comprising logical qubits 110 in substantially planar regions 120 in accordance with certain implementations described herein. The system 100 comprises a first plurality of logical qubits 110a in a first substantially planar region 120a, at least some of the first plurality of logical qubits 110a configured to interact with one another. The system 100 further comprises a second plurality of logical qubits 110b in a second substantially planar region 120b that is substantially parallel to the first substantially planar region 120a. At least some of the second plurality of logical qubits 110b are configured to interact with one another and to interact with the at least some of the first plurality of logical qubits 110a. The logical qubits 110 of FIG. 1 form multiple-qubit gates across multiple 2-D planar optical trap layers in accordance with certain implementations described herein.

In certain implementations, as schematically illustrated by FIG. 1, the example system 100 further comprising a third plurality of logical qubits 110c in a third substantially planar region 120c that is substantially parallel to the second substantially planar region 120b. At least some of the third plurality of logical qubits 110c are configured to interact with one another and to interact with the at least some of the second plurality of logical qubits 110b. Other example systems 100 compatible with certain implementations described herein can comprise at least one additional plurality of logical qubits 110 in at least one additional substantially planar region 120 that is substantially parallel to the first, second, and third substantially planar regions 120a,b,c, with the at least one additional plurality of logical qubits 110 configured to interact with one another and to interact with the at least some of the first, second, and/or third pluralities of logical qubits 110a,b,c. In certain such implementations, the system 100 can comprise four, five, six, or more pluralities of logical qubits 110 arranged in four, five, six, or more substantially planar regions 120 that are substantially parallel to one another and the logical qubits 110 of the various planar regions 120 configured to interact with one another (e.g., intra-planar interactions and inter-planar interactions).

In certain implementations, the pluralities of logical qubits 110 (e.g., the first plurality of logical qubits 110a, the second plurality of logical qubits 110b, and/or the third plurality of logical qubits 110c) comprise at least one physical qubit selected from the group consisting of: naturally occurring atoms; neutral atoms; charged atoms; ions; molecules; artificially formed atoms; Rydberg atoms; nitrogen-vacancy (NV) centers in diamond; Bose-Einstein condensates (BECs); electrons; photons; quantum particles; quantum dots; phonons; transmons; quantum states that behave as quantum particles. In certain implementations, the logical qubits 110 of the pluralities of logical qubits 110 (e.g., the first, second, and/or third pluralities of logical qubits 110a,b,c) are individually addressable.

In certain implementations, at least some of the logical qubits 110 (e.g., the at least some of the first plurality of logical qubits 110a, the at least some of the second plurality of logical qubits 110b, and/or the at least some of the third plurality of logical qubits 110c) are configured to interact directly with one another to form at least one three-dimensional (3-D) gate cell array (e.g., comprising a plurality of multiple-qubit 3-D gate cells 130) configured to undergo multiple-qubit gate operations in which more than two logical qubits 110 participate simultaneously. For example, each logical qubit 110 of a 3-D gate cell 130 can be configured to be quantum-mechanically entangled with at least one other logical qubit 110 of the 3-D gate cell 130.

In certain implementations, each first logical qubit 110a in the first planar region 120a can be configured to interact directly with some (e.g., nearest neighboring and next-nearest neighboring) other first logical qubits 110a in the first planar region 120a. Similarly, each second logical qubit 110b in the second planar region 120b can be configured to interact directly with some (e.g., nearest neighboring and next-nearest neighboring) other second logical qubits 110b in the second planar region 120b and each third logical qubit 110c in the third planar region 120c can be configured to interact directly with some (e.g., nearest neighboring and next-nearest neighboring) other third logical qubits 110c in the third planar region 120c. Furthermore, each first logical qubit 110a in the first planar region 120a can be configured to interact directly with some (e.g., nearest neighboring and next-nearest neighboring) second logical qubits 110b within the second planar region 120b, each second logical qubit 110b in the second planar region 120b can be configured to interact directly with some (e.g., nearest neighboring and next-nearest neighboring) third logical qubits 110c within the third planar region 120c, and each third logical qubit 110c in the third planar region 120c can be configured to interact directly with some (e.g., nearest neighboring and next-nearest neighboring) second logical qubits 110b within the second planar region 120b. Although not shown in FIG. 1, in certain implementations, at least some of the logical qubits 110 can also directly interact with even more distant logical qubits 110 (e.g., next-next-nearest neighboring logical qubits 110; next-next-next-nearest neighboring logical qubits 110) in the same planar region 120 and/or in an adjacent planar region 120.

Figure 2A:
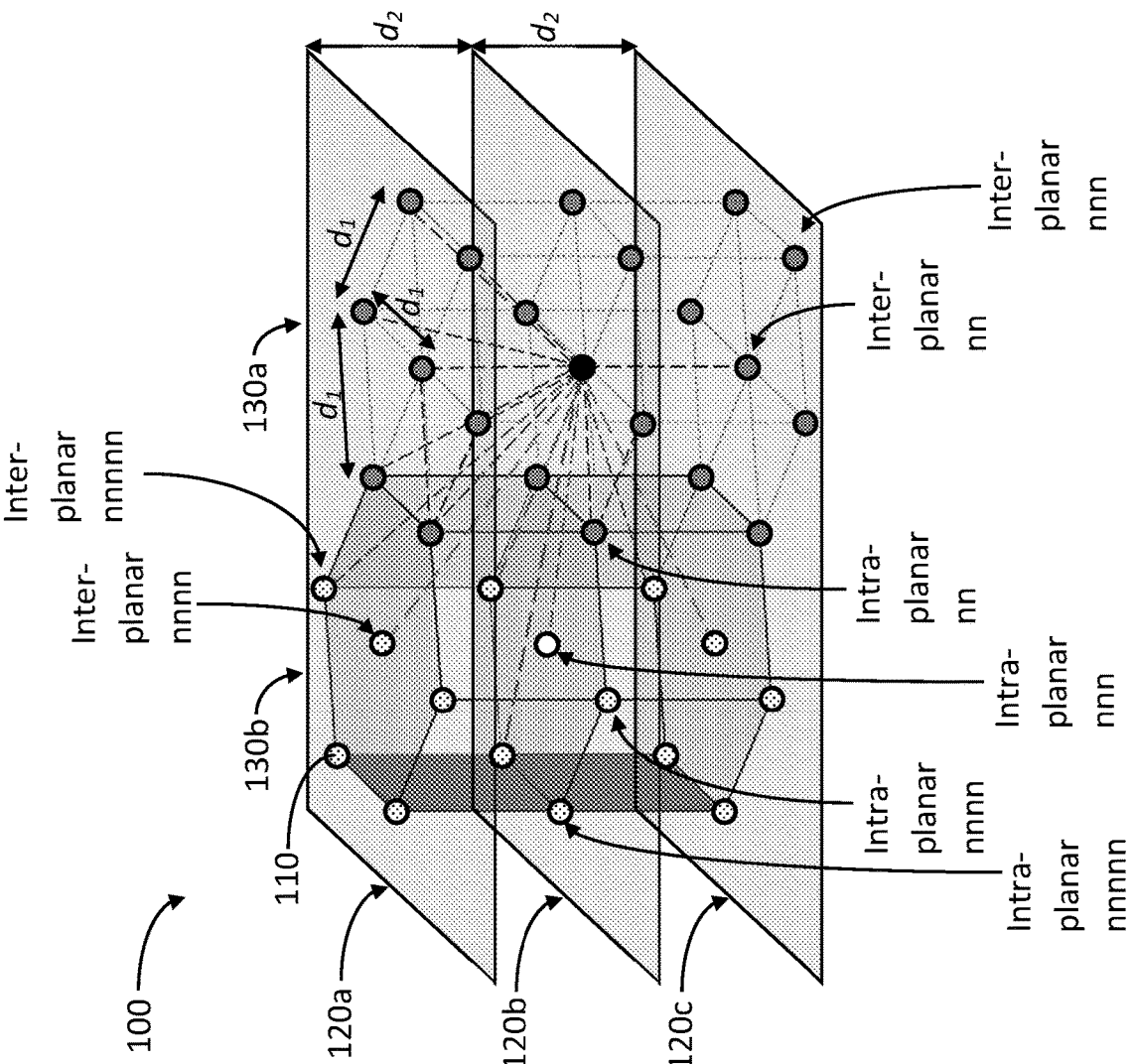
FIG. 2A schematically illustrates a perspective view of an example system comprising 36 logical qubits in three substantially planar regions that are substantially parallel to one another in accordance with certain implementations described herein.
Figure 2B:
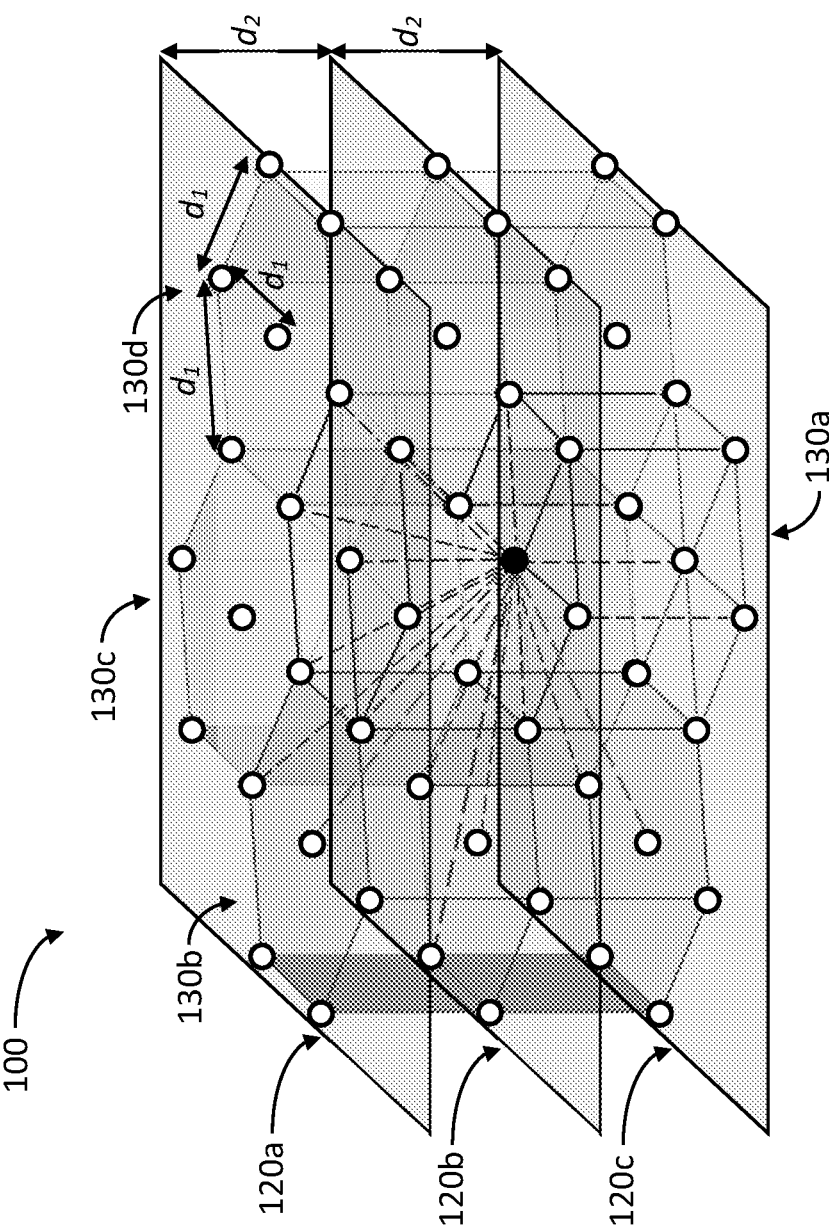
FIG. 2B schematically illustrates a perspective view of another example system comprising 60 logical qubits in three substantially planar regions that are substantially parallel to one another in accordance with certain implementations described herein.

FIG. 2A schematically illustrates a perspective view of an example system 100 comprising 36 logical qubits 110 in three substantially planar regions 120a,b,c that are substantially parallel to one another in accordance with certain implementations described herein. FIG. 2B schematically illustrates a perspective view of another example system 100 comprising 60 logical qubits 110 in three substantially planar regions 120a,b,c that are substantially parallel to one another in accordance with certain implementations described herein. The example systems 100 of FIGS. 2A and 2B each comprise a 3-D lattice qubit array comprising 2-D planar optical lattice layers forming multiple-qubit gates (e.g., in a 3-D hexagonal regular or "pyrochlore" lattice qubit array configuration with the logical qubits 110 suspended or trapped in multiple planar layers with orthogonal connections between logical qubits 110 in adjacent substantially planar regions 120).

In certain implementations, the logical qubits 110 shown in FIGS. 2A or FIG. 2B are all the logical qubits 110 of the example system 100, while in certain other implementations, the logical qubits shown in FIG. 2A or FIG. 2B are only a subset of the logical qubits 110 of the example system 100. The logical qubits 110 form at least one multiple-qubit 3-D gate cell 130. For example, each pair of adjacent 3-D gate cells 130 share two first logical qubits 110a in the first planar region 120a, two second logical qubits 110b in the second planar region 120b, and two third logical qubits 110c in the third planar region 120c.

Each of the planar regions 120a,b,c of FIG. 2A comprises 12 logical qubits 110 arranged in a substantially hexagonal 2-D pattern and each of the planar regions 120a,b,c of FIG. 2B comprises 20 logical qubits 110 arranged in a substantially hexagonal 2-D pattern. The logical qubits 110 of FIGS. 2A and 2B have an intraplanar nearest-neighbor (nn) distance $d_1$ between each logical qubit 110 and its nearest neighboring logical qubits 110 within each planar region 120a,b,c and for FIGS. 2A and 2B, the intraplanar nearest-neighbor (nn) distance between each logical qubit 110 and its nearest neighboring logical qubits 110 in the other planar regions 120 equals the interplanar distance $d_2$. In certain implementations, the intraplanar nn distance $d_1$ of each of the planar regions 120a,b,c is substantially equal to one another, while in certain other implementations, the intraplanar nn distance $d_1$ of at least two of the planar regions 120a,b,c differ from one another. In certain implementations, the interplanar distance $d_2$ between planar regions 120a,b and between planar regions 120b,c are substantially equal to one another, while in certain other implementations, the interplanar distance $d_2$ between planar regions 120a,b and between planar regions 120b,c differ from one another.

In certain implementations, the intraplanar nn distance $d_1$ and the interplanar distance $d_2$ are substantially equal to one another (e.g., less than 15 microns; in a range of 3 microns to 15 microns; in a range of 8 microns to 11 microns), while in certain other implementations, the intraplanar nn distance $d_1$ and the interplanar distance $d_2$ differ from one another (e.g., by a difference in a range of 1 micron to 3 microns), with either $d_1 > d_2$ or $d_1 < d_2$. For example, the 2-D hexagonal patterns of qubits 110 in the planar regions 120 of the systems 100 of FIGS. 2A and 2B can have the intraplanar nn distance $d_1$ equal to the interplanar distance $d_2$, the interplanar next-nearest-neighbor (nnn) distance is equal to $d_1\sqrt{2}$, the intraplanar nnn distance is equal to $d_1\sqrt{3}$, the intraplanar next-next-nearest-neighbor (nnnn) distance is equal to $2d_1$, the interplanar nnnn distance is equal to $2d_1$, the interplanar next-next-next-nearest-neighbor (nnnnn) distance is equal to $d_1\sqrt{5}$, and the intraplanar nnnnn distance is equal to $d_1\sqrt{7}$.

Other configurations of the 2-D hexagonal patterns of qubits 110 in the planar regions 120 can have different lateral offsets between the planar regions 120 (e.g., offsets parallel to the planar regions 120 such that the qubits 110 in one planar region 120 are not directly above the qubits 110 of an adjacent planar region 120; see, e.g., FIGS. 5A-5C, 6A-6F). As described herein, such configurations can have other values of the intraplanar nn distance $d_1$, the interplanar distance $d_2$, and the various intraplanar and interplanar nnn, nnnn, and nnnnn distances.

In certain implementations, as shown in FIG. 2A, 21 of the logical qubits 110 form a first multiple-qubit 3-D gate cell 130a (e.g., a $C^{20}$NOT gate cell or a $C^{20}\varphi$ gate cell) and 21 of the logical qubits 110 form a second multiple-qubit 3-D gate cell 130b (e.g., a $C^{20}$NOT gate cell or a $C^{20}\varphi$ gate cell). For example, a logical qubit 110 in the planar region 120b (shown in FIG. 2A as black) can be the target qubit of the first gate cell 130a, and can be simultaneously quantum-mechanically entangled with its 20 control qubits (shown in FIG. 2A as dark grey), namely, its six intraplanar nearest neighboring logical qubits 110, its two interplanar nearest neighboring logical qubits 110 (e.g., one in each of the planar regions 120a,c), and its twelve interplanar next-nearest neighboring logical qubits 110 (e.g., six in each of the planar regions 120a,c). Similarly, another logical qubit 110 in the planar region 120b (shown in FIG. 2A as white) can be the target qubit of the second gate cell 130b and can be simultaneously quantum-mechanically entangled with its 20 control qubits 110 (e.g., 14 of which are shown in FIG. 2A as light grey and six of which are dark grey since they are also control qubits of the first gate cell 130a). In certain implementations, as shown in FIG. 2B, 21 of the logical qubits 110 can form a third multiple-qubit 3-D gate cell 130c and 21 of the logical qubits 110 can form a fourth multiple-qubit 3-D gate cell 130d.

Each $C^{20}$NOT/$C^{20}\varphi$ gate cell 130 of FIGS. 2A and 2B can be referred to as a "Pyrochlore cell" due to the similarity of its arrangement to that of pyrochlore crystal structures. As described herein, in certain implementations, more logical qubits 110 can be simultaneously quantum-mechanically entangled with one another to form larger multiple-qubit gate cells 130 (e.g., $C^{34}$NOT gate cells; $C^{34}\varphi$ gate cells; $C^{94}$NOT gate cells; $C^{94}\varphi$ gate cells, etc.). These larger gate cells 130 can each be referred to as a "Super Pyrochlore cell."

While FIGS. 2A and 2B indicate some of the entanglements between the various logical qubits 110 with dashed and solid lines of various weights, all of the logical qubits 110 of a gate cell 130 (e.g., first gate cell 130a) can interact directly (e.g., can be simultaneously quantum-mechanically entangled; fully entangled; completely entangled) with one another and all of the logical qubits 110 of another gate cell 130 (e.g., second gate cell 130b) can interact directly (e.g., can be simultaneously quantum-mechanically entangled) with one another. In certain implementations, each logical qubit 110 is configured to interact directly with its intraplanar nearest neighboring (nn) logical qubits 110, its interplanar nearest neighboring (nn) logical qubits 110, and its interplanar next-nearest neighboring (nnn) logical qubits 110. In certain other implementations, each logical qubit 110 is further configured to interact directly with its intraplanar next-nearest neighboring (nnn) logical qubits 110, its interplanar next-next-nearest neighboring (nnnn) logical qubits 110, its intraplanar next-next-nearest neighboring (nnnn) logical qubits 110, and/or its interplanar next-next-next-nearest neighboring (nnnnn) logical qubits 110. In certain other implementations, each logical qubit 110 is further configured to interact directly with its intraplanar next-next-next-nearest neighboring (nnnnn) qubits 110. FIG. 2A labels some example logical qubits 110 with their relationship to the single logical qubit 110 shown as black. By having the logical qubits 110 interact directly with additional logical qubits 110, the number of logical qubits 110 within a gate cell 130 can be increased, thereby increasing the computational power of the gate cell 130.

In certain implementations, each multiqubit gate cell 130 is formed by 21 entangled qubits 110 (e.g., as shown in FIGS. 2A and 2B) that can be operated as a "native" $C^{20}$NOT gate (e.g., a 20-controlled NOT gate) and/or as a "native" $C^{20}\varphi$ gate (e.g., a 20-controlled phase gate). Such native $C^{20}NOT/C^{20}\varphi$ gates can be achieved with far fewer gate operations than would be used by one- or two-qubit gates alone. In certain implementations, the net fidelity of the native $C^{20}NOT/C^{20}\varphi$ gate provided by the example 21-qubit gate cell 130 is significantly greater than that of a $C^{20}NOT/C^{20}\varphi$ gate comprising many two-qubit gates that may have much higher individual gate fidelities, since the 21-qubit gate cell 130 does not aggregate the errors of many successive operations to achieve its result. In certain such implementations, the $C^{20}NOT/C^{20}\varphi$ gate provided by the example 21-qubit gate cell 130 uses a very small fraction of the steps of a $C^{20}NOT/C^{20}\varphi$ gate comprising many two-qubit gates, so the $C^{20}NOT/C^{20}\varphi$ gate provided by the example 21-qubit gate cell 130 is faster and less error-prone (e.g., thereby utilizing significantly less error correction at the outset), as can be seen in a comparison of the probabilities of successful gate operation using both structures and fidelity estimates.

Figure 3A:
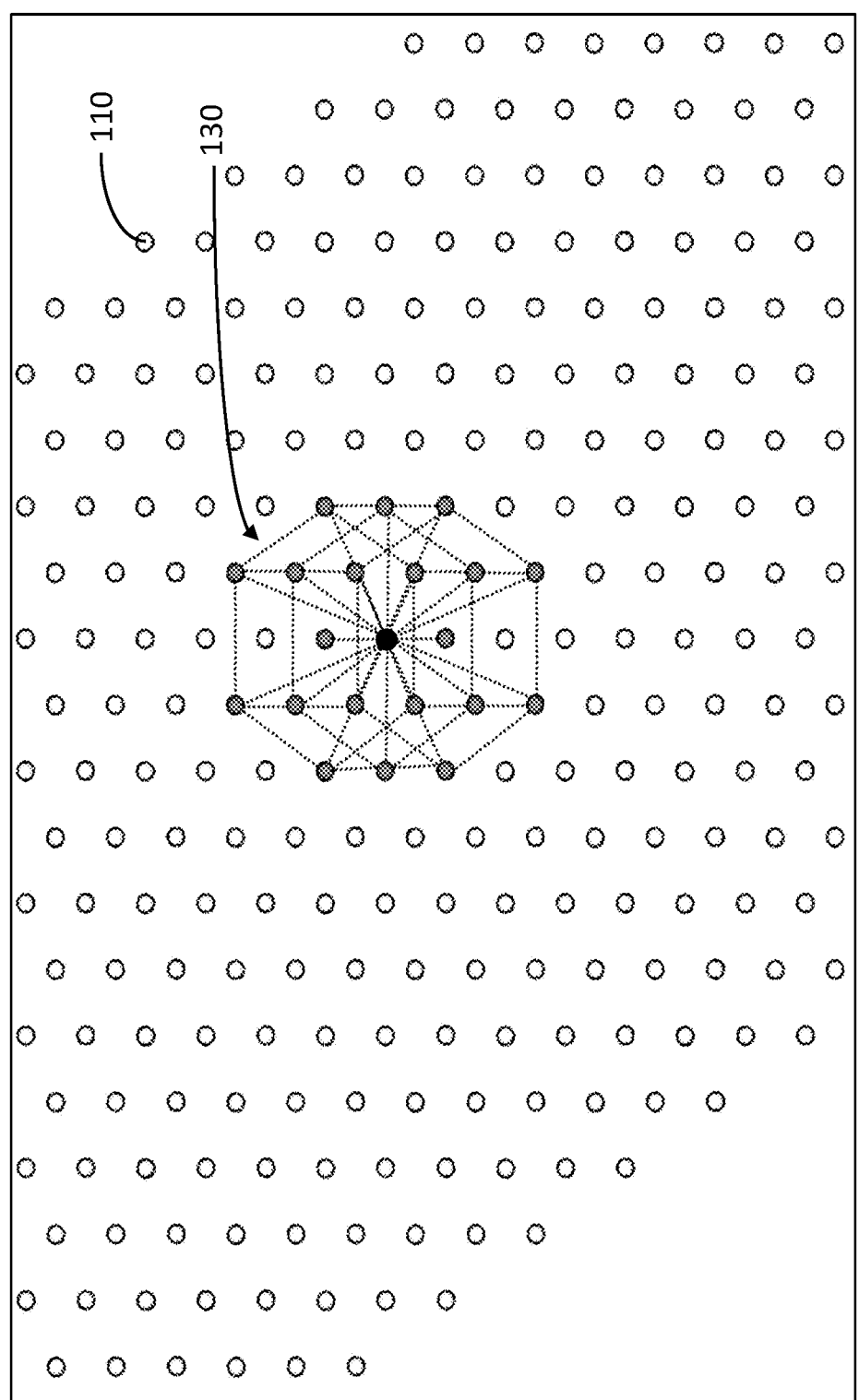
FIG. 3A schematically illustrates a perspective view of a plurality of logical qubits arranged in three substantially planar regions that are substantially parallel to one another (e.g., compatible with the example systems of FIGS. 2A and 2B) in accordance with certain implementations described herein.

In certain implementations, the number of logical qubits 110 per gate cell 130 can be increased by increasing the number of substantially planar regions 120 and/or by extending the distance at which the logical qubits 110 can directly interact with one another. For example, FIG. 3A schematically illustrates a perspective view of a plurality of logical qubits 110 arranged in three substantially planar regions 120 that are substantially parallel to one another (e.g., compatible with the example systems 100 of FIGS. 2A and 2B) in accordance with certain implementations described herein. The perspective view of FIG. 3A is along a direction in which all of the logical qubits 110 are viewable (e.g., none of the logical qubits 110 are obscured by another logical qubit 110). FIG. 3A includes lines between some of the logical qubits 110, the lines denoting some of the direct interactions between the logical qubits 110 of a gate cell 130. Each logical qubit 110 is configured to interact directly with its intraplanar nearest neighboring logical qubits 110, its interplanar nearest neighboring logical qubits 110, and its interplanar next-nearest neighboring logical qubits 110 and the gate cell 130 of FIG. 3A is a $C^{20}NOT$ gate cell or a $C^{20}\varphi$ gate cell (e.g., with an example target qubit shown as black and its control qubits shown as dark grey).

Figure 3B:
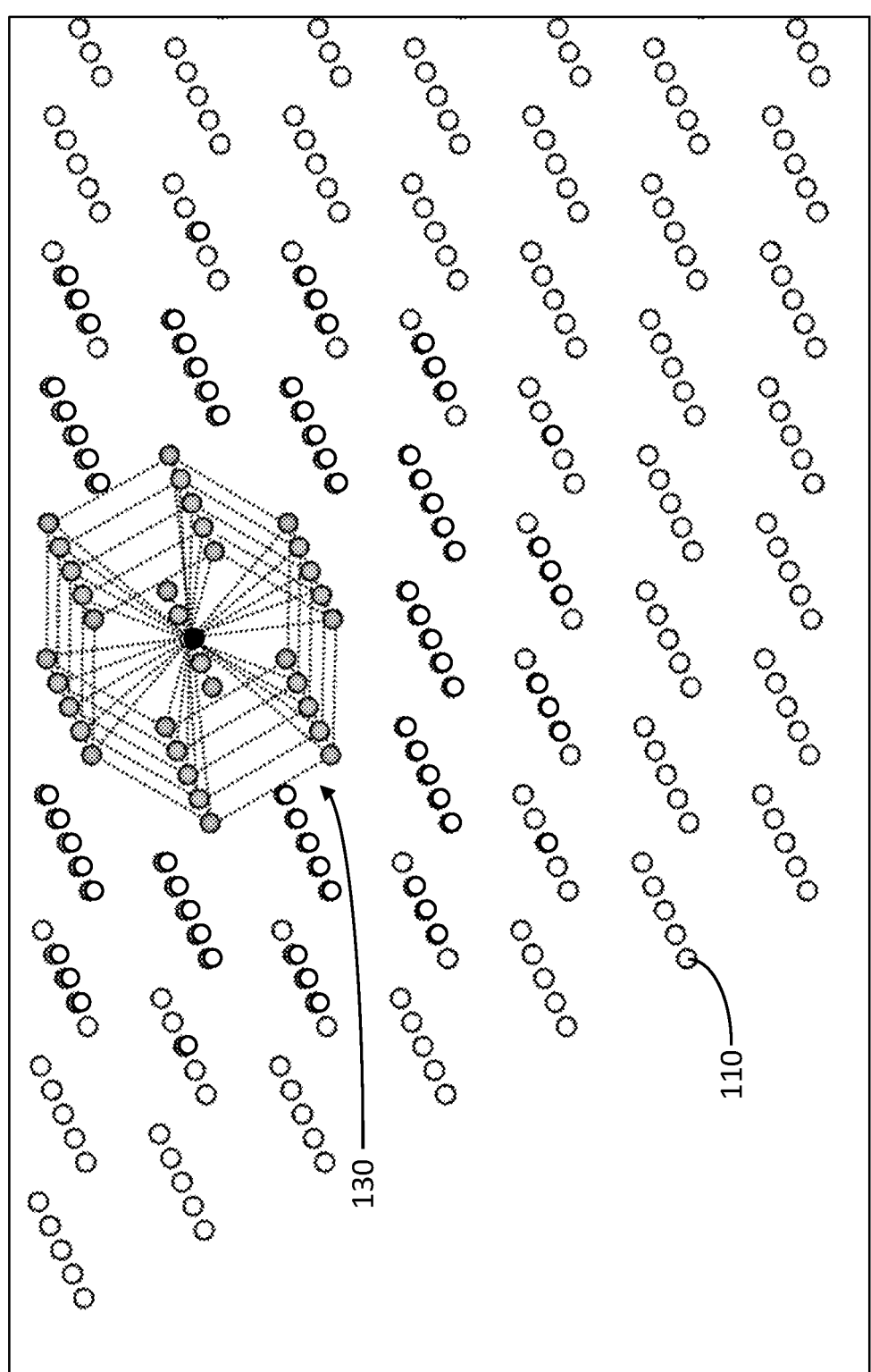
FIGS. 3B and FIG. 3C each schematically illustrate a perspective view of a plurality of logical qubits arranged in five substantially planar regions that are substantially parallel to one another in accordance with certain implementations described herein.
Figure 3C:
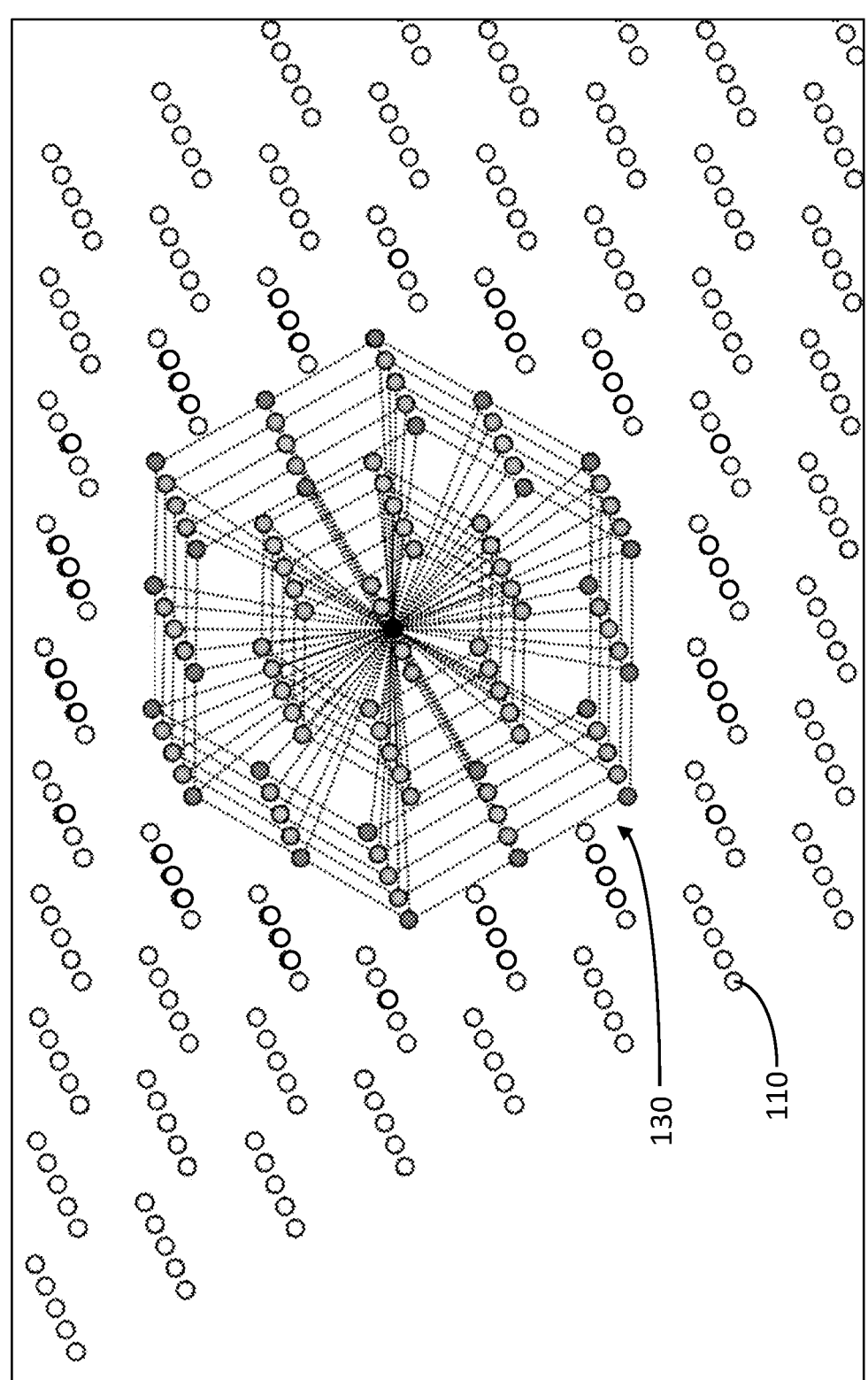

For other examples, each of FIGS. 3B and FIG. 3C schematically illustrates a perspective view of a plurality of logical qubits 110 arranged in five substantially planar regions 120 that are substantially parallel to one another in accordance with certain implementations described herein. The perspective views of FIGS. 3B and 3C are along a direction in which all of the logical qubits 110 are viewable (e.g., none of the logical qubits 110 are obscured by another logical qubit 110) and includes lines between some of the logical qubits 110, the lines denoting some of the direct interactions between the logical qubits 110 of a gate cell 130. For FIG. 3B, each logical qubit 110 is configured to interact directly with its intraplanar nearest neighboring logical qubits 110, its interplanar nearest neighboring logical qubits 110, and its interplanar next-nearest neighboring logical qubits 110 and the gate cell 130 of FIG. 3B is a $C^{34}NOT$ gate cell or a $C^{34}\varphi$ gate cell (e.g., with an example target qubit shown as black and its control qubits shown as dark grey). For FIG. 3C, each logical qubit 110 is configured to interact directly with its intraplanar nearest neighboring logical qubits 110, its interplanar nearest neighboring logical qubits 110, its intraplanar next-nearest neighboring logical qubits 110, and its intraplanar next-next-nearest neighboring logical qubits 110. The gate cell 130 of FIG. 3C is a $C^{94}NOT$ gate cell or a $C^{94}\varphi$ gate cell (e.g., with an example target qubit shown as black and its control qubits shown as dark grey). The example arrangements of FIGS. 3A-3C illustrate the advantageously increased degree of simultaneous connectivity (e.g., entanglement) possible by using neutral (e.g., Rydberg) atom traps formed by hexagonal cell, N-layer optical lattices to form "Super Pyrochlore" cells (e.g., a 21-qubit $C^{20}NOT/C^{20}\varphi$ gate 130 in a 3-layer regular hexagonal atom lattice; a 35-qubit $C^{34}NOT/C^{34}\varphi$ gate 130 in a 5-layer regular hexagonal atom lattice; a 95-qubit $C^{94}NOT/C^{94}\varphi$ gate 130 in a 5-layer regular hexagonal atom lattice) in accordance with certain implementations described herein.

Figure 4A:
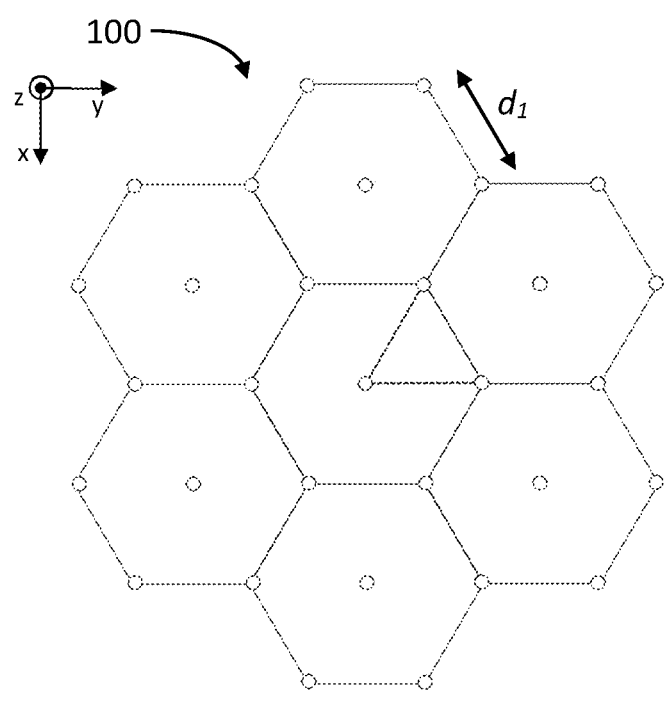
FIGS. 4A and 4B schematically illustrate a top view (e.g., along the z-axis) and a perspective view, respectively, of a portion of an example system comprising three planar regions each comprising a corresponding plurality of logical qubits in accordance with certain implementations described herein.
Figure 4B:
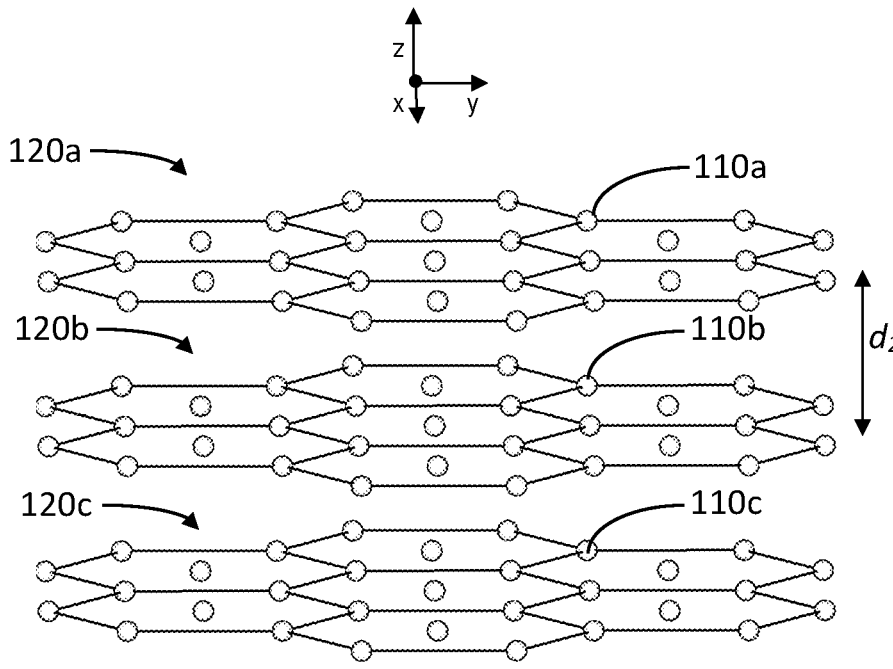

FIGS. 4A-4B, 5A-5C, and 6A-6D schematically illustrate portions of example systems 110 with different relative displacements amongst the logical qubits 110 of the multiple substantially planar regions 120 in accordance with certain implementations described herein. FIGS. 4A and 4B schematically illustrate a top view (e.g., along the z-axis) and a perspective view, respectively, of a portion of an example system 100 comprising three planar regions 120$a,b,c$ each comprising a corresponding plurality of logical qubits 110$a$, $b,c$ in accordance with certain implementations described herein. The logical qubits 110 within each of the planar regions 120 are arranged in a substantially hexagonal 2-D pattern and the planar regions 120 are substantially parallel to one another. In the hexagonal regular lattice array of FIGS. 4A and 4B, the 3-D configurations includes orthogonal connections between qubits in adjacent planar regions 120. In FIGS. 4A and 4B, the logical qubits 110 of a substantially planar region 120 are not substantially displaced along a direction substantially parallel to the planar region 120 from the logical qubits 110 of an adjacent substantially planar region 120. For example, as shown in FIG. 4A, the logical qubits 110$a$ of the top-most planar region 120$a$ are aligned with corresponding logical qubits 110$b,c$ in the other two planar regions 120$b,c$ such that the logical qubits 110$a$ are viewable from above (e.g., along the z-axis) while the logical qubits 110$b,c$ are obscured by the logical qubits 110$a$. This example system 100 of FIGS. 4A and 4B corresponds to those of FIGS. 2A and 2B (e.g., in which the example 21-qubit $C^{20}NOT/C^{20}\varphi$ gates 130 have the intraplanar nn distance $d_1$ and the interplanar distance $d_2$ substantially equal to one another and in which each logical qubit 110 is configured to interact directly with its intraplanar nearest neighboring logical qubits 110, its interplanar nearest neighboring logical qubits 110, and its interplanar next-nearest neighboring logical qubits 110).

Figure 5A:
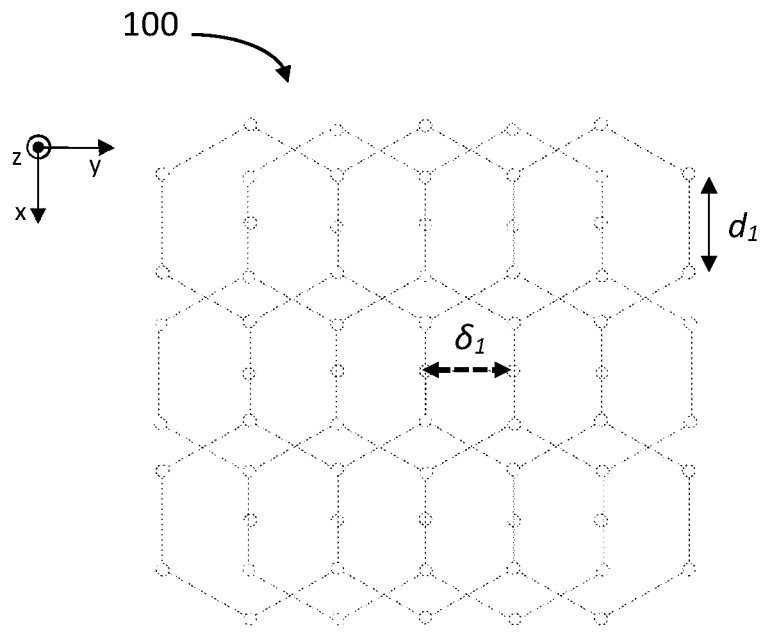
FIGS. 5A and 5B schematically illustrate a top view (e.g., along the z-axis) and a perspective view, respectively, of a portion of another example system comprising three planar regions each comprising a corresponding plurality of logical qubits in accordance with certain implementations described herein.
Figure 5B:
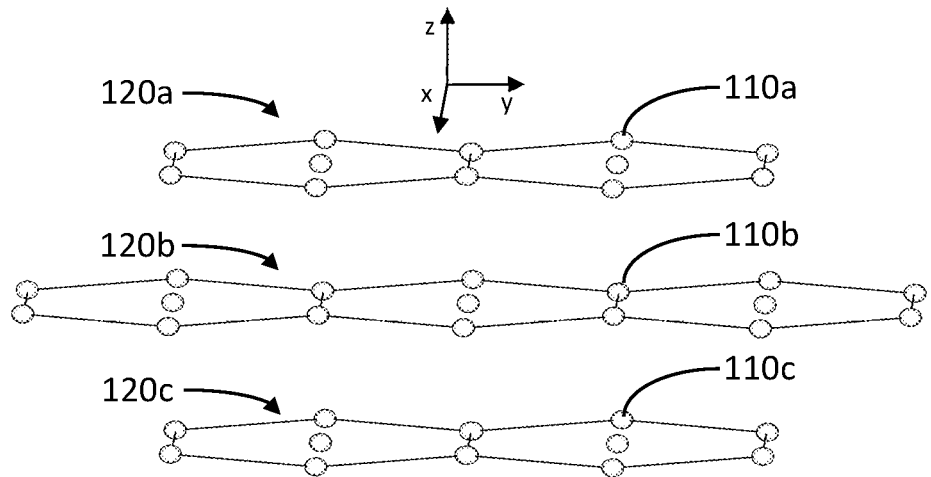

FIGS. 5A and 5B schematically illustrate a top view (e.g., along the z-axis) and a perspective view, respectively, of a portion of another example system 110 comprising three planar regions 120$a,b,c$ each comprising a corresponding plurality of logical qubits 110$a,b,c$ in accordance with certain implementations described herein. The logical qubits 110 within each of the planar regions 120 are arranged in a substantially hexagonal 2-D pattern and the planar regions 120 are substantially parallel to one another. In the alternative hexagonal lattice array of FIGS. 5A-5C, the 3-D configurations includes nonorthogonal connections between qubits in adjacent planar regions 120, and such an alternative configuration can expand the engineering trade space of optimal access angle choices for the optical lattice. In FIGS. 5A and 5B, the logical qubits 110 of a substantially planar region 120 are displaced (e.g., offset) along a direction substantially parallel to the planar region 120 from the logical qubits 110 of an adjacent substantially planar region 120.

Figure 5C:
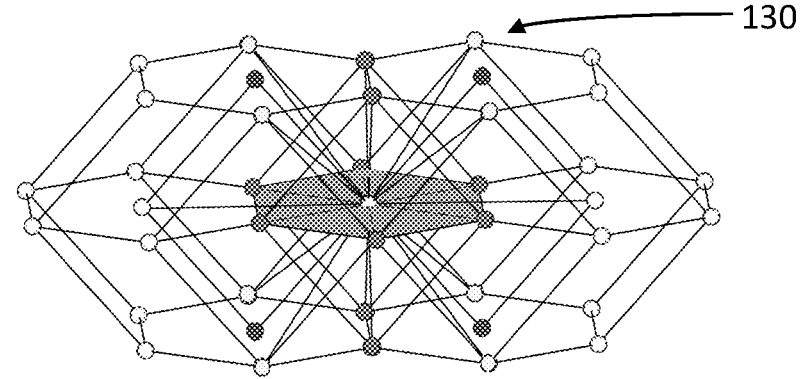
FIG. 5C schematically illustrates a perspective view similar to that of FIG. 5B in accordance with certain implementations described herein.

For example, as shown in FIGS. 5A and 5B, the logical qubits 110$a$ are displaced relative to the logical qubits 110$b$ in a direction along the y-axis (e.g., perpendicular to the x- and z-axes; shown by a dashed double-headed arrow in FIG. 5A) with a displacement magnitude of $\delta_1 = d_1\sqrt{3}/2$, but are aligned with the logical qubits 110c, such that the logical qubits 110a,b of the planar regions 120a,b are viewable from above (e.g., along the z-axis), while the logical qubits 110c are obscured by the logical qubits 110a. FIG. 5C schematically illustrates a perspective view similar to that of FIG. 5B, in which the intraplanar nn distance $d_1$ and the distance between the interplanar nearest neighbor qubits are substantially equal to one another such that the interplanar distance $d_2$ is substantially equal to $d_1\sqrt{3}/2$, and in which each logical qubit 110 is configured to interact directly with its intraplanar nearest neighboring logical qubits 110, its interplanar nearest neighboring logical qubits 110, its intraplanar next-nearest neighboring logical qubits 110, its interplanar next-nearest neighboring logical qubits 110, and its interplanar next-next-nearest neighboring logical qubits 110 in accordance with certain implementations described herein. As shown in FIG. 5C, an example 23-qubit $C^{22}NOT/C^{22}\varphi$ gates 130 has a target qubit (black) and 22 control qubits (dark grey).

Figure 6A:
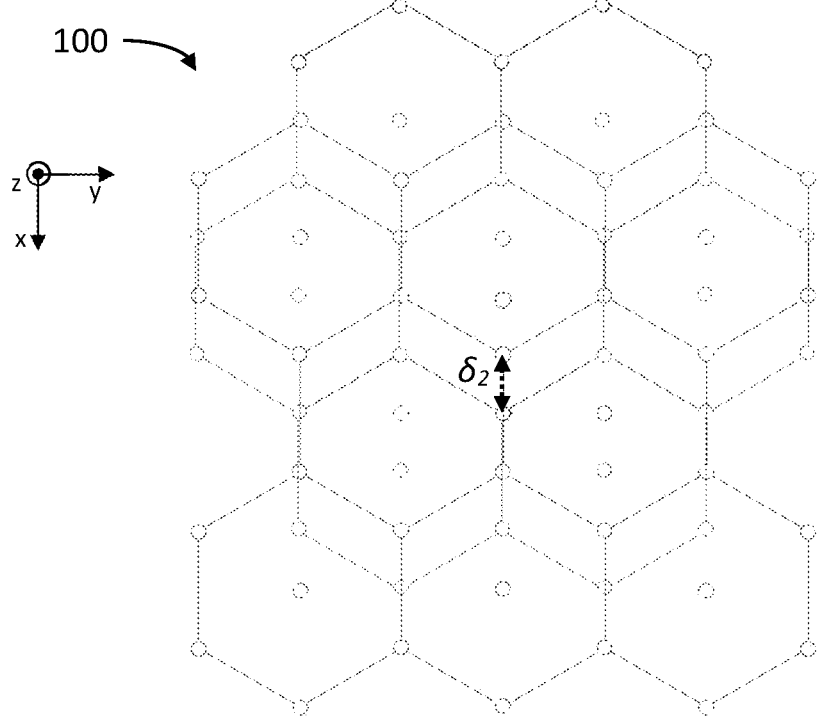
FIGS. 6A and 6B schematically illustrate a top view (e.g., along the z-axis) and a perspective view, respectively, of a portion of still another example system comprising three planar regions each comprising a corresponding plurality of logical qubits in accordance with certain implementations described herein.
Figure 6B:
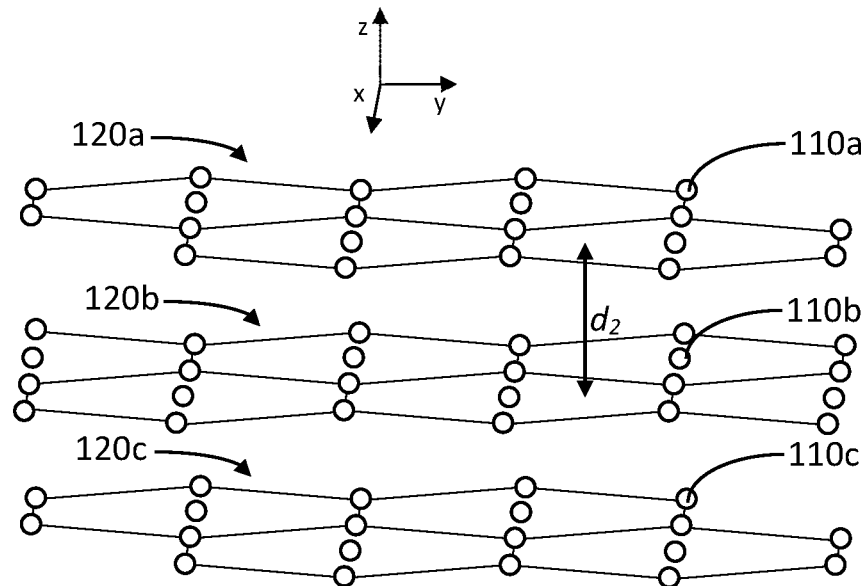
Figure 6C:
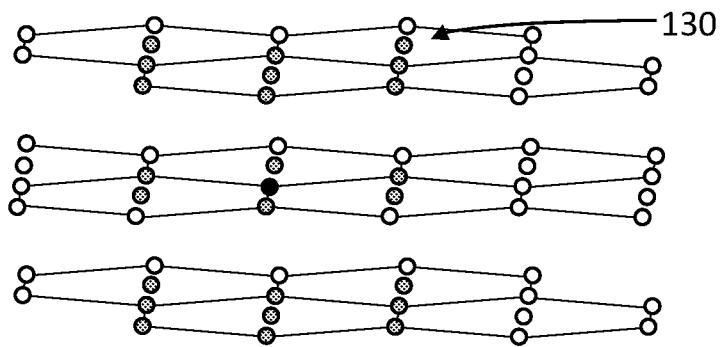
FIG. 6C schematically illustrates a perspective view similar to that of FIG. 6B in accordance with certain implementations described herein.

FIGS. 6A and 6B schematically illustrate a top view (e.g., along the z-axis) and a perspective view, respectively, of a portion of still another example system 110 comprising three planar regions 120a,b,c each comprising a corresponding plurality of logical qubits 110a,b,c in accordance with certain implementations described herein. The logical qubits 110 within each of the planar regions 120 are arranged in a substantially hexagonal 2-D pattern and the planar regions 120 are substantially parallel to one another. In FIGS. 6A and 6B, the logical qubits 110 of a substantially planar region 120 are displaced along a direction substantially parallel to the planar region 120 from the logical qubits 110 of an adjacent substantially planar region 120. For example, as shown in FIGS. 6A and 6B, the logical qubits 110a are displaced relative to the logical qubits 110b in a direction along the x-axis (e.g., perpendicular to the y- and z-axes; shown by a dashed double-headed arrow in FIG. 6A) with a displacement magnitude of $\delta_2 = d_1/2$, but are aligned with the logical qubits 110c, such that the logical qubits 110a,b of the planar regions 120a,b are viewable from above (e.g., along the z-axis), while the logical qubits 110c are obscured by the logical qubits 110a. FIG. 6C schematically illustrates a perspective view similar to that of FIG. 6B, in which the intraplanar nn distance $d_1$ and the distance between the interplanar nearest neighboring qubits are substantially equal to one another such that the interplanar distance $d_2$ is substantially equal to $d_1\sqrt{3}/2$, and in which each logical qubit 110 is configured to interact directly with its intraplanar nearest neighboring logical qubits 110, its interplanar nearest neighboring logical qubits 110, its intraplanar next-nearest neighboring logical qubits 110, its interplanar next-nearest neighboring logical qubits 110, and its interplanar next-next-nearest neighboring logical qubits 110 in accordance with certain implementations described herein. As shown in FIG. 6C, an example 25-qubit $C^{24}NOT/C^{24}\varphi$ gate 130 has a target qubit (black) and 24 control qubits (dark grey).

Figure 6D:
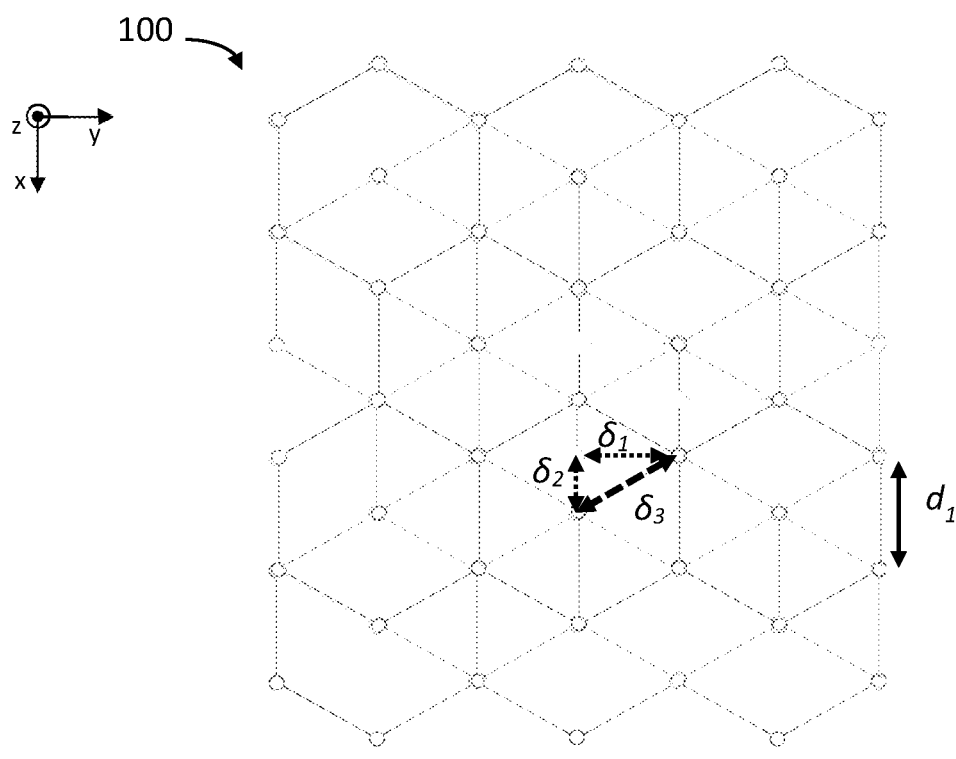
FIGS. 6D and 6E schematically illustrate a top view (e.g., along the z-axis) and a perspective view, respectively, of a portion of still another example system comprising three planar regions, each comprising a corresponding plurality of logical qubits in accordance with certain implementations described herein.
Figure 6E:
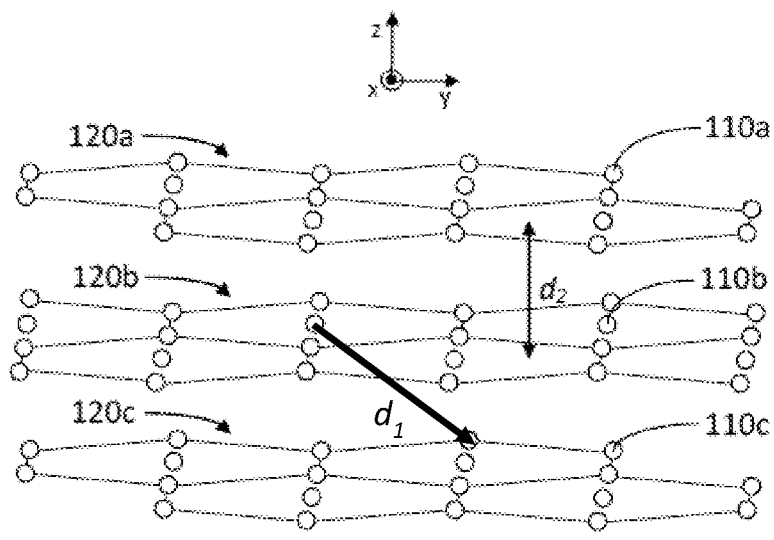

FIGS. 6D and 6E schematically illustrate a top view (e.g., along the z-axis) and a perspective view, respectively, of a portion of still another example system 110 comprising three planar regions 120a,b,c, each comprising a corresponding plurality of logical qubits 110a,b,c in accordance with certain implementations described herein. The logical qubits 110 within each of the planar regions 120 are arranged in a substantially hexagonal 2-D pattern and the planar regions 120 are substantially parallel to one another. In FIGS. 6D and 6E, the logical qubits 110 of a substantially planar region 120 are displaced along a direction substantially parallel to the planar region 120 from the logical qubits 110 of an adjacent substantially planar region 120. For example, as shown in FIGS. 6D and 6E, the logical qubits 110a are displaced relative to the logical qubits 110b by a displacement magnitude $\delta_3$ substantially equal to $d_1$, having a first component along the y-axis with magnitude $\delta_1 = d_1\sqrt{3}/2$ and a second component along the x-axis with magnitude $\delta_2 = d_1/2$. The logical qubits 110a are aligned with the logical qubits 110b,c, such that the logical qubits 110b,c are obscured by the logical qubits 110a in FIG. 6D.

Figure 6F:
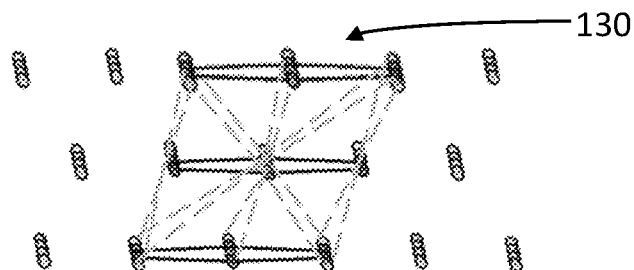
FIG. 6F schematically illustrates a perspective view similar to that of FIG. 6E in accordance with certain implementations described herein.

FIG. 6F schematically illustrates a perspective view similar to that of FIG. 6E, in which the intraplanar nn distance $d_1$ and the distance between the interplanar nearest neighboring qubits are substantially equal to one another such that the interplanar distance (e.g., separation) between the planes $d_2 = d_1\sqrt{3}/2$ and in which each logical qubit 110 is configured to interact directly with its intraplanar nearest neighboring logical qubits 110, its interplanar nearest neighboring logical qubits 110, its intraplanar next-nearest neighboring logical qubits, its interplanar next-nearest neighboring logical qubits 110, and its interplanar next-next-nearest neighboring logical qubits 110 in accordance with certain implementations described herein. As shown in FIG. 6F, an example 21-qubit $C^{20}NOT/C^{20}\varphi$ gate 130 has a target qubit (shown as black) and 20 control qubits. In this and all examples above, there exist angles from which all logical qubits 110a,b,c are viewable and individually addressable and individually detectable.

FIGS. 5A-5C and 6A-6F schematically illustrate example displacements between the logical qubits 110 of the planar regions 120, the displacements having example directions and magnitudes. Certain other implementations have displacements in other directions (e.g., having magnitudes both along the x-axis and the y-axis) and/or having other magnitudes (e.g., ½ cell width; ⅓ cell width). Certain other implementations have differing interplanar distances $d_2$. For example, the separation between planar regions 120 can be reduced according to the angle from vertical between nearest logical qubits 110 across the adjacent planar regions 120 (e.g., $d_2$ equal to $d_1/2$; $2 \cdot d_1/3$; $3 \cdot d_1/4$; $0.85 \cdot d_1$). Also, while FIGS. 5A-5C and 6A-6F schematically illustrate example systems 100 having 2-D substantially hexagonal patterns, other 2-D patterns are also compatible with certain implementations described herein.

In certain implementations, the first plurality of logical qubits 110a are individually addressable and arranged in a substantially planar first optical lattice, the second plurality of logical qubits 110b are individually addressable and arranged in a substantially planar second optical lattice substantially parallel to the first optical lattice, and the third plurality of logical qubits 110c are individually addressable and arranged in a substantially planar third optical lattice substantially parallel to the second optical lattice. In certain implementations, the system 100 comprises at least one additional plurality of logical qubits 110 in at least one additional substantially planar region 120 substantially parallel to the third substantially planar region 120c, the at least one additional plurality of logical qubits 110 configured to interact with one another and/or to interact with at least some of the third plurality of logical qubits 110c, wherein the at least one additional plurality of logical qubits 110 are individually addressable. For example, the number of substantially parallel optical lattices of pluralities of qubits can further comprise a fourth optical lattice, a fifth optical lattice, a sixth optical lattice, a seventh optical lattice, and so on. The plurality of confinement regions can further comprise at least one additional confinement region arranged in at least one additional optical lattice substantially parallel to the third optical lattice, the at least one additional optical lattice comprising the at least one additional plurality of logical qubits.

Figure 7A:
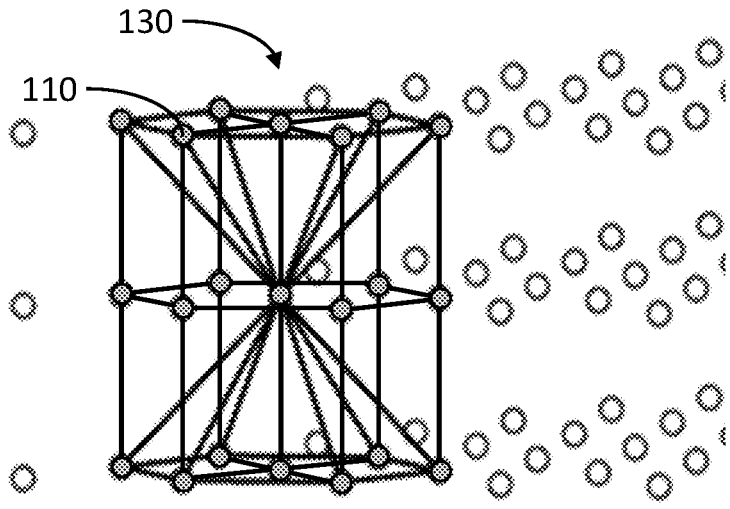
FIGS. 7A-7E schematically illustrate various views of an example multiple-qubit gate cell (e.g., a $C^{20}NOT$ gate cell or $C^{20}\varphi$ gate cell having 21 qubits in a Pyrochlore configuration with a target qubit in the center and control qubits elsewhere) formed among multiple 2-D planar optical trap regions and having a plurality of addressing laser light beams in accordance with certain implementations described herein.
Figure 7B:
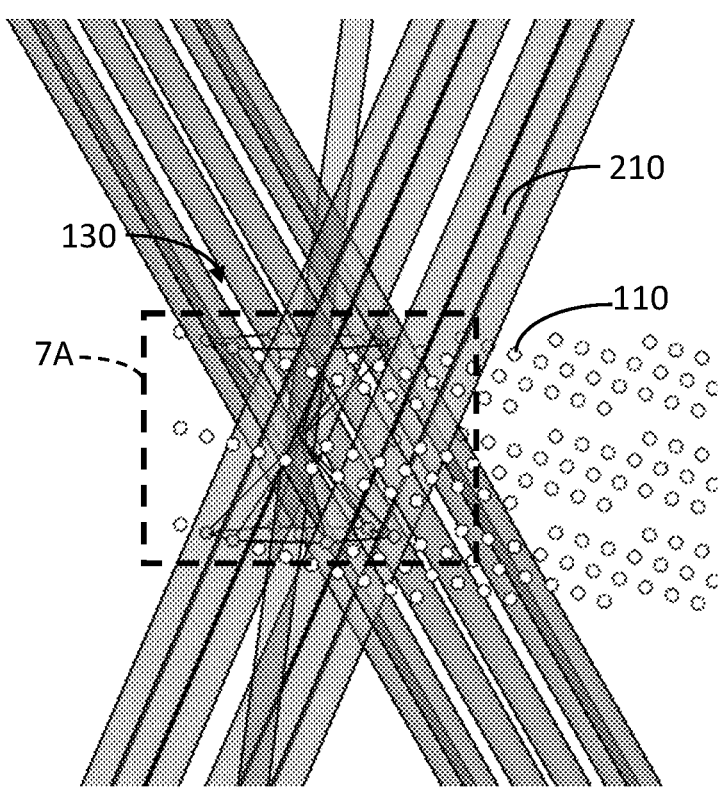
Figure 7C:
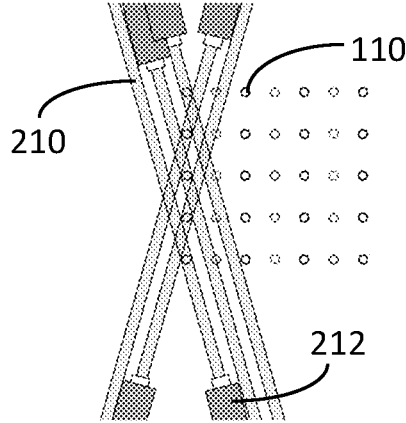
Figure 7D:
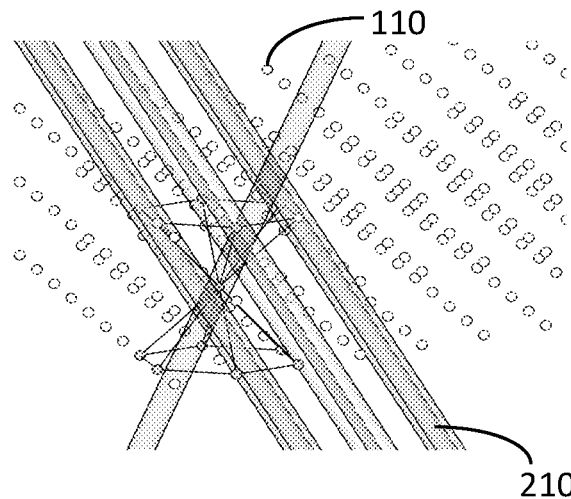
Figure 7E:
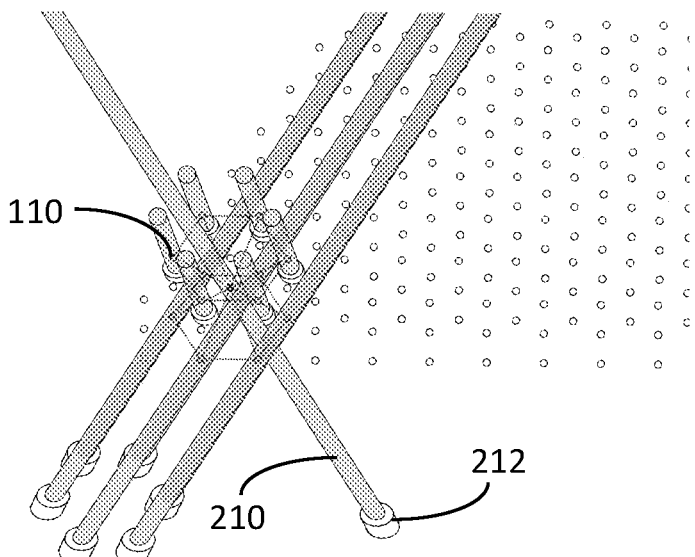

For example, FIGS. 7A-7E schematically illustrate various views of an example multiple-qubit gate cell 130 (e.g., a $C^{20}$NOT gate cell or $C^{20}\varphi$ gate cell having 21 qubits 110 in a Pyrochlore configuration with a target qubit in the center and control qubits elsewhere) formed among multiple 2-D planar optical trap regions and having a plurality of addressing laser light beams 210 in accordance with certain implementations described herein. FIG. 7A depicts the atomic qubits of the multilayer lattice structure of the multiple-qubit gate cell 130. The lines between the qubits 110 in FIG. 7A only denote some of the entanglements between the qubits 110 and lines denoting the other entanglements between the qubits 110 are omitted for clarity. FIG. 7B depicts this multiple-qubit gate cell 130 with only some of the addressing laser light beams 210 (e.g., emitted from optical ports 212) that are configured to illuminate the atoms individually, and arrays of trapping laser light beams 220 that create the optical potential wells containing the atoms are omitted for clarity. As seen in FIGS. 7C and 7D, each of the addressing laser light beams 210 illuminates a single atom of the multiple-qubit gate cell 130. A limitation of 2-D views is that one illustration by itself can make it appear that a single laser light beam is intersecting more than one atom. However, the laser light beams 210 are arranged in alternating rows and are illustrated as transparent. As a result, an atom that is between or behind multiple laser light beams 210 may be seen "through" beams that do not address it in a way that can make one atom appear to be in multiple laser light beams, or make one laser light beam appear to intersect multiple atoms when in fact each atom is intersected by at most one addressing laser light beam. Certain implementations described herein are configured to entangle a maximum number of qubits simultaneously between nearest neighbors, next-nearest neighbors, next-next-nearest neighbors, etc. such that many more qubits 110 can participate in a single native gate operation. Since the potential processing power of each gate cell increases exponentially with the number of qubits 110 that participate simultaneously in each gate operation, the processing power of certain implementations described herein overall increases exponentially as well. Dynamic reconfigurability of the gate structures and arrangement of certain implementations are greatly improved as well.

FIGS. 8A-8E schematically illustrate various views of trapping laser light beams 220 in accordance with certain implementations described herein. These example implementations of FIGS. 8A-8D utilizes neutral (e.g., uncharged) Rydberg atoms trapped in 3-D optical lattices (see, e.g., I. Bloch, Nature Physics, 1, 23 (2005)) of potential wells formed in or between intersecting trapping optical beams 220 (e.g., trapping laser light beams emitted from optical ports 222). In certain implementations described herein, atoms are trapped in minimum potential energy (e.g., null) regions that are formed in lattice spaces between coaligned and crossing optical beams (see, e.g., FIGS. 8A and 8B), whereas in certain other implementations atoms can be trapped within intersecting optical beams (see, e.g., FIGS. 8C and 8D). Such trapping within intersecting trapping optical beams 220 is described by S. E. Anderson, et al. Phys. Rev. Lett. 107, 263001 (2011); T. M. Graham et al., Phys. Rev. Lett. 123, 230501 (2019)).

FIGS. 8A-8E employ lattice spacings in a range of 8 microns to 11 microns (e.g., less than 12 microns) between nearest-neighbor qubits 110. For an example in which |101S>;|109S>Rydberg transitions of Cesium (Cs) (e.g., cooled to 77 K, 300 K, or some other temperature) are utilized, a nominal 8 micron lattice cell size is within the range of optimal values for certain multiply-controlled quantum gate operations based on the referenced data curves. Certain such implementations can provide both design feasibility and certain design advantages in accordance with certain implementations described herein.

In certain implementations, atomic qubits arranged in alternating columns can be in alternating planes with staggered offsets (e.g., ½ cell offset spacing along x or y, ⅓ cell offset spacing along x or y, ¼×¼ cell offset cell spacing along x and y) between adjacent planes, which can enable the formation of regular hexagonal prism configurations of fully-connected entangled atomic qubits and can enable slantwise hexagonal prism configurations as seen from certain views. For example, the intersecting trapping laser light beams 220 can form composite angles with respect to a coordinate system that can be defined as the length x and width y of a planar base (e.g., horizontal dimensions) along with height z (e.g., vertical dimension) of the example quantum computing system (e.g., a first array of trapping laser light beams 220 aligned along x-axis +18.5 degrees toward z-axis, y=0 intersecting a second array of trapping laser light beams 220 aligned at x-axis +60 deg toward y-axis, z=0) relative to a reference plane (e.g., horizontal; x-y plane) such that 3-D crossings of the intersecting trapping laser light beams 220 can be close to orthogonal. The potential wells formed between trapping laser light beams 220 can be substantially symmetric in a plane (e.g., with cross-sections that are square or diamond-shaped) when viewed at certain angles, which can create substantially uniform potential wells (e.g., saddle-shaped wells; saddle points). For example, in FIGS. 8B and 8D, the first and second arrays of trapping laser light beams 220 can appear rectangular or trapezoidal from certain views. However, trapping laser light beams 220, appearing to be angled from lower left to upper right in FIGS. 8B and 8D, can also be angled downward in the 3-D structure, such that the intersections of the first and second arrays of trapping laser light beams depicted as horizontal in FIGS. 8B and 8D appear nearly orthogonal as viewed diagonally from certain access angles. In certain implementations, the atom confinement structure can form regular hexagonal prisms across planes (e.g., as shown in FIGS. 1A, 1B, 1D), and in certain other implementations, the atom-to-atom geometric structure can appear slanted or angular to form slantwise hexagonal prism configurations. In certain implementations, the optical beam intersections can appear nonorthogonal from various views and angles, however, the angular 3-D lattice structure of certain implementations is designed to allow maximum spatial separation between atoms when viewed from those angles for optimal addressing and readout (e.g., detection) of qubits.

Figure 9A:
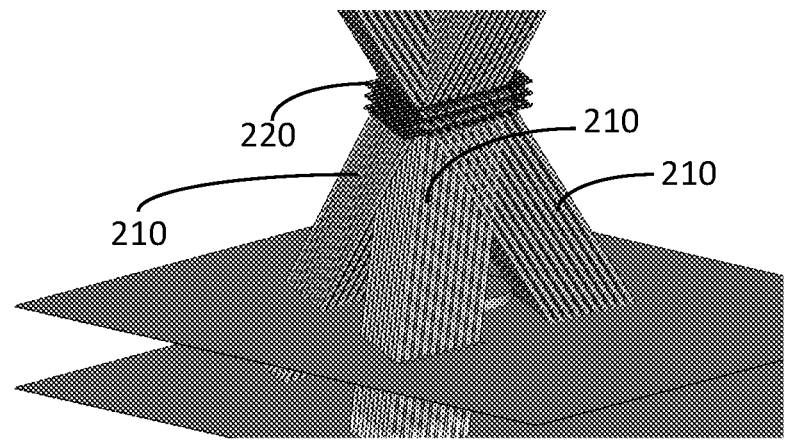
FIGS. 9A-9B schematically illustrate perspective views of a three-layer, 10×10 atom trap lattice created by intersecting arrays of trapping laser light beams in accordance with certain implementations described herein.
Figure 9B:
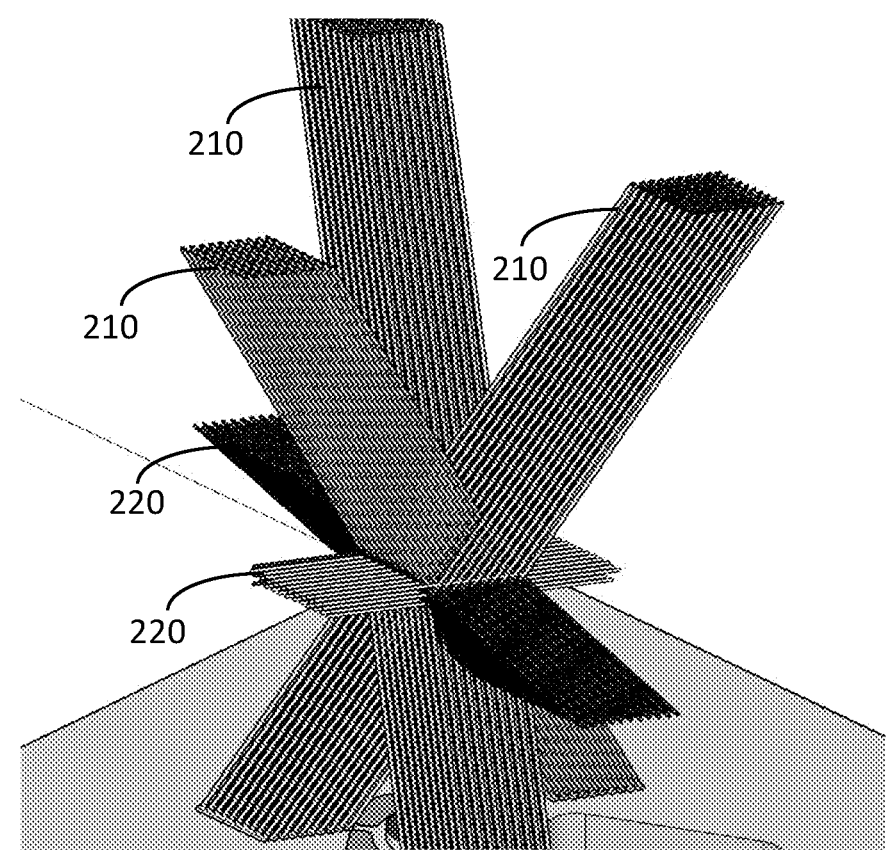
Figure 9C:
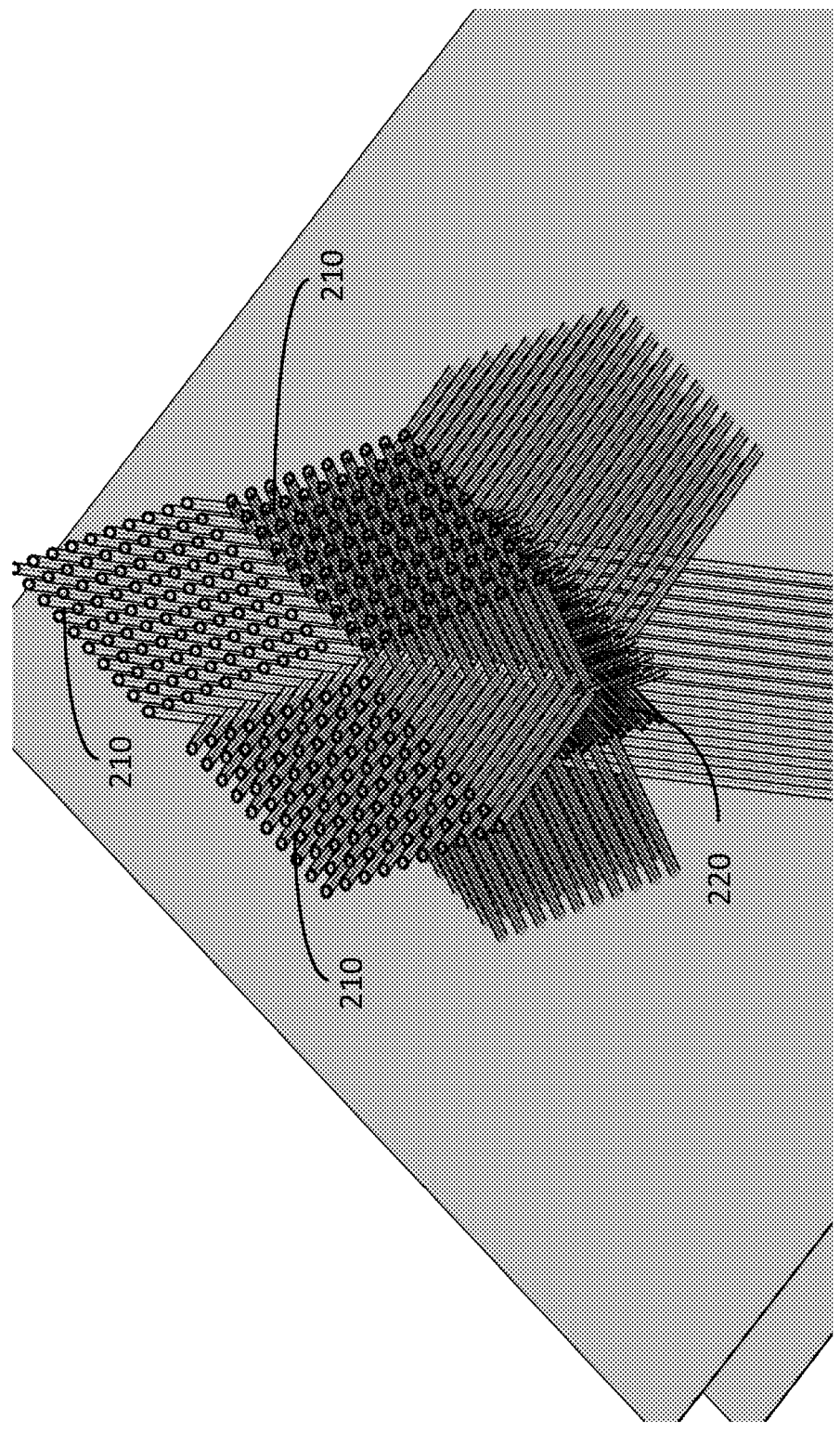
FIG. 9C schematically illustrates a top view of the structure of FIGS. 9A-9B in accordance with certain implementations described herein.

FIGS. 9A-9B schematically illustrate perspective views of a three-layer, 10×10 atom trap lattice created by intersecting arrays of trapping laser light beams 220 in accordance with certain implementations described herein. FIG. 9C schematically illustrates a top view of the structure of FIGS. 9A-9B. Also shown are three interlaced arrays of addressing laser light beams 210 in accordance with certain implementations described herein.

Figure 10A:
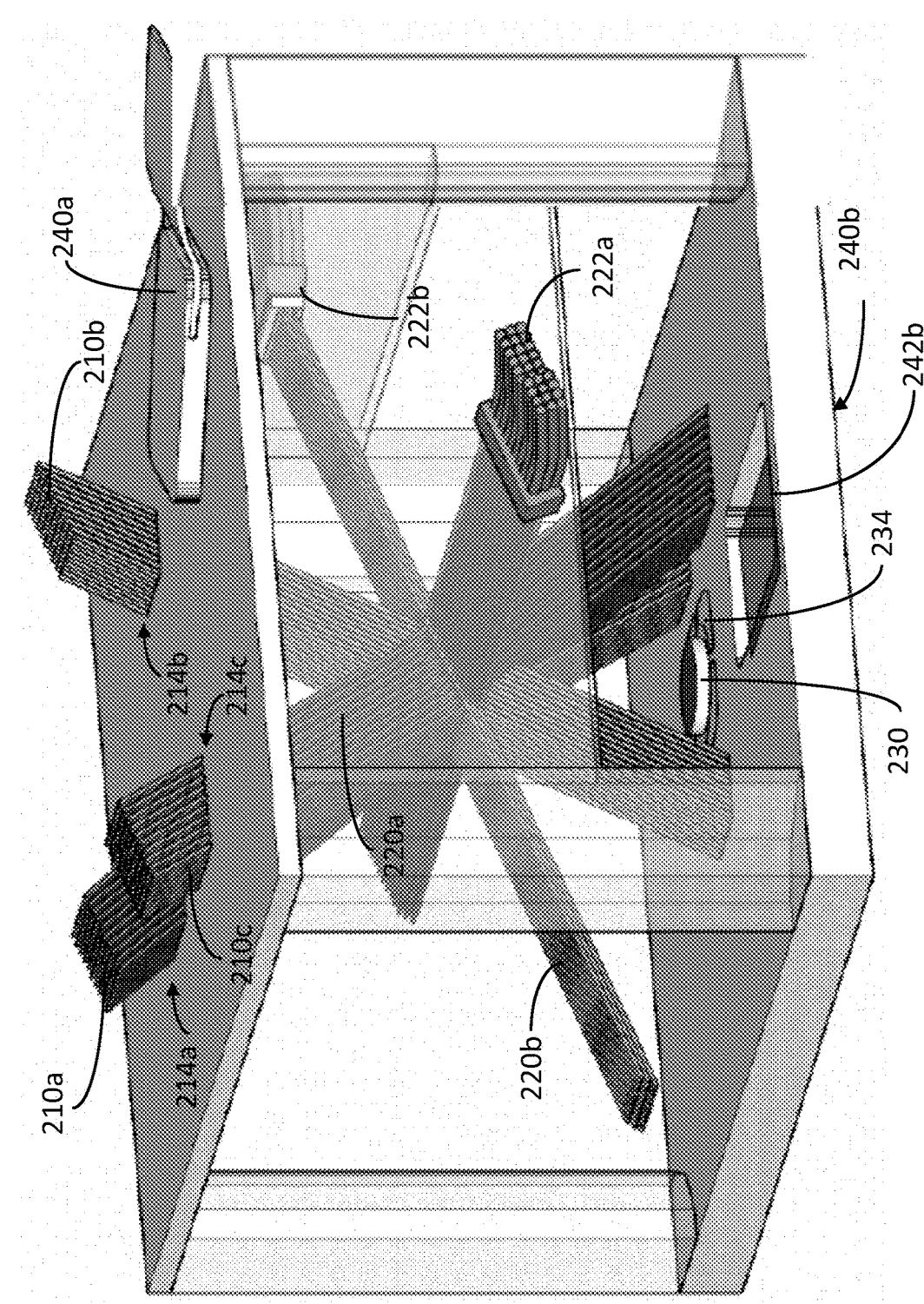
FIG. 10A schematically illustrates a perspective view of a partially assembled QC system comprising a three-layer, 10×10 atom lattice with three sets of addressing laser light beams and two intersecting arrays of trapping laser light beams in accordance with certain implementations described herein.
Figure 10B:
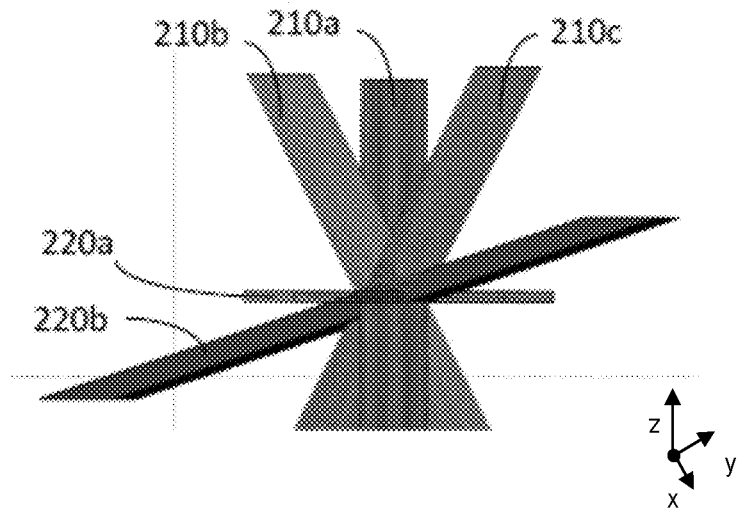
FIGS. 10B-10D show other views from different directions of the three sets of addressing laser light beams and two intersecting arrays of trapping laser light beams of FIG. 10A in accordance with certain implementations described herein.
Figure 10C:
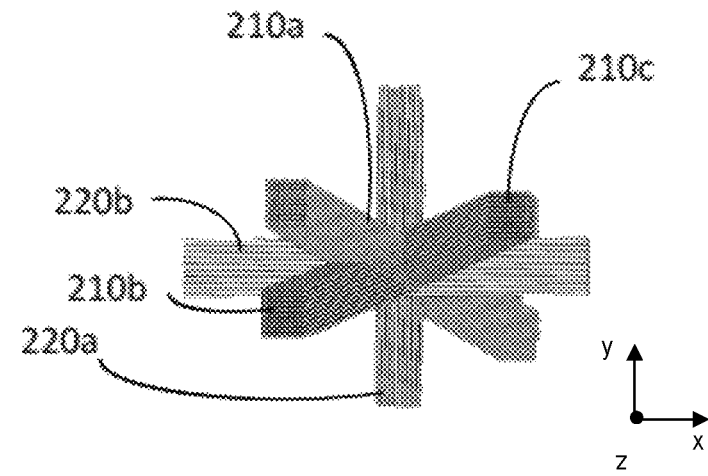
Figure 10D:
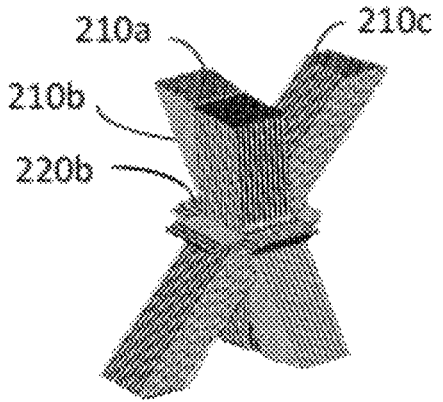

FIG. 10A schematically illustrates a perspective view of a partially assembled QC system 100 comprising a three-layer, 10×10 atom lattice with three sets of addressing laser light beams 210*a,b,c* and two intersecting arrays of trapping laser light beams 220*a,b* in accordance with certain implementations described herein. FIG. 10A also shows optical ports 214*a,b,c* through which the addressing laser light beams 210*a,b,c* extend, optical fiber ports 222*a,b* emitting the trapping laser light beams 220*a,b*, a magnetic field source 230, configured to generate a magnetic field as part of the optical trap configuration (electrodes 234 configured to generate an electric field as part of the optical trap configuration are shown in FIG. 10A), and first and second optical detectors 240*a,b* (e.g., CCD detector array) configured to receive and detect fluorescent light from the qubits via corresponding optical detector ports 242*a,b*. FIGS. 10B-10D show other views from different directions of the three sets of addressing laser light beams 210*a,b,c* and two intersecting arrays of trapping laser light beams 220*a,b* of FIG. 10A in accordance with certain implementations described herein.

Figure 10E:
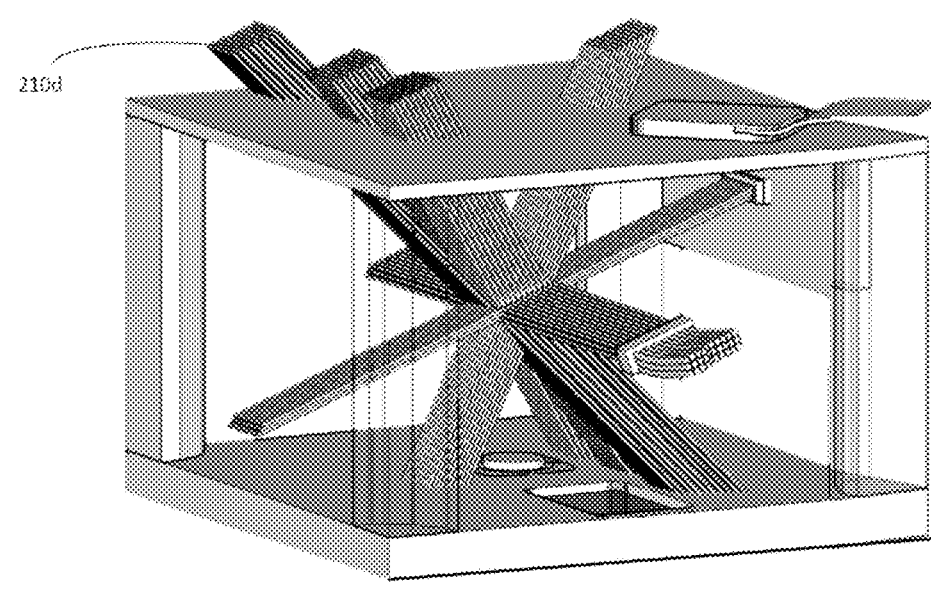
FIG. 10E schematically illustrates a perspective view of another partially assembled QC system comprising a three-layer, 10×10 atom lattice with four sets of addressing laser light beams and two intersecting arrays of trapping laser light beams in accordance with certain implementations described herein.
Figure 10F:
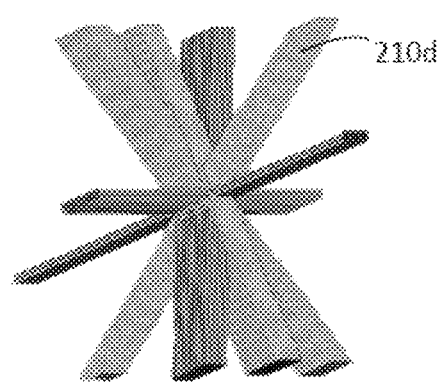
FIGS. 10F-10H show other views from different directions of the four sets of addressing laser light beams and two intersecting arrays of trapping laser light beams of FIG. 10E in accordance with certain other implementations described herein.
Figure 10G:
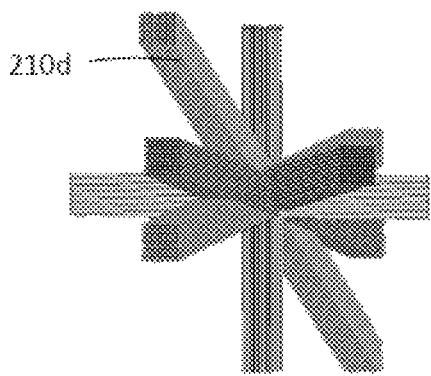
Figure 10H:
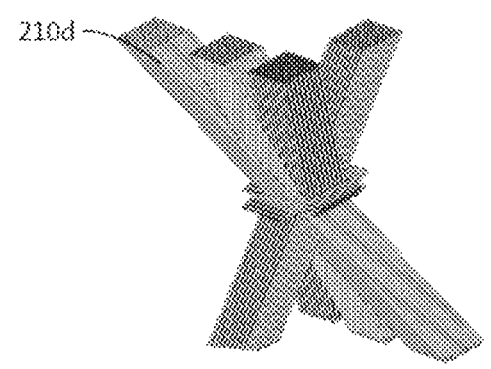

While FIGS. 10A-10D schematically illustrate an example QC system 100 having three sets of addressing laser light beams 210*a,b,c,* in certain other implementations, the QC system 100 can comprise four or more sets of addressing laser light beams 210. For example, FIG. 10E schematically illustrates a perspective view of another partially assembled QC system 100 comprising a three-layer, 10×10 atom lattice with four sets of addressing laser light beams 210*a,b,c,d* and two intersecting arrays of trapping laser light beams 220*a,b* in accordance with certain implementations described herein. FIGS. 10F-10H show other views from different directions of the four sets of addressing laser light beams 210*a,b,c,d* and two intersecting arrays of trapping laser light beams 220*a,b* of FIG. 10E in accordance with certain other implementations described herein.

As used herein, all directions lying in the x-y plane are defined as 0 degrees in elevation (e.g., horizontal) and the direction orthogonal to x and y (e.g., vertical) is defined as z. Further, the direction along y is defined as 0 degrees in azimuth (e.g., rotation about z), and the direction 0 degrees in azimuth, 0 degrees in elevation is expressed as (0°, 0°). For example, in certain implementations described herein, laser arrays can be oriented to intersect as shown in FIGS. 10A-10C (e.g., trapping laser light beams 220*a* at (0°, 0°), trapping laser light beams 220*b* at (90°, +20°), and the rows of lasers 220*a* can be arranged with a cross-sectional tilt (e.g., elevation) of +20 degrees such that the intersection of trapping laser beams 220*a* and 220*b* forms a 2-D lattice laying in a plane angled at +20 degrees from the x-y plane. In certain such implementations, the trapping cells formed by the substantially orthogonal intersecting lasers can be substantially square-shaped. Addressing laser light beams 210*a* at (293.5°, +53.5°), addressing laser light beams 210*b* at (246.5°, +53.5°), and addressing laser light beams 210*c* at (71.5°, +58°). In certain other implementations described herein, the intersection of trapping laser beams can be arranged advantageously at other angles to form trapping cells that are diamond shaped or rhombus shaped to enable the addition of more planar qubit lattice arrays while continuing to enable multiple addressing laser angles for individually addressing each qubit in the 3-D lattice. For example, in another implementation that is simple to describe, trapping laser beams 220*a* can be arranged at (30°, 0°) and trapping laser beams 220*b* can be arranged at (90°,)+20° with addressing lasers at (0°, 60°), (120°, 60°), (240°, 60°). Note that this particular combination of angles as depicted in FIG. 10B is chosen for visual clarity; ease of discrimination of two compact arrays (e.g., clusters; banks)

of trapping laser light beams 220 that appear laterally oriented versus the three compact arrays of addressing laser light beams 210 that appear at angles that appear closer to vertical. Other examples can utilize alternative combinations of composite angles that form substantially orthogonal intersections of lattice lasers within a 3-D structure while similarly optimizing opportunities for lines of sight for addressing and detecting individual qubits in accordance with certain other implementations described herein.

Figure 11A:
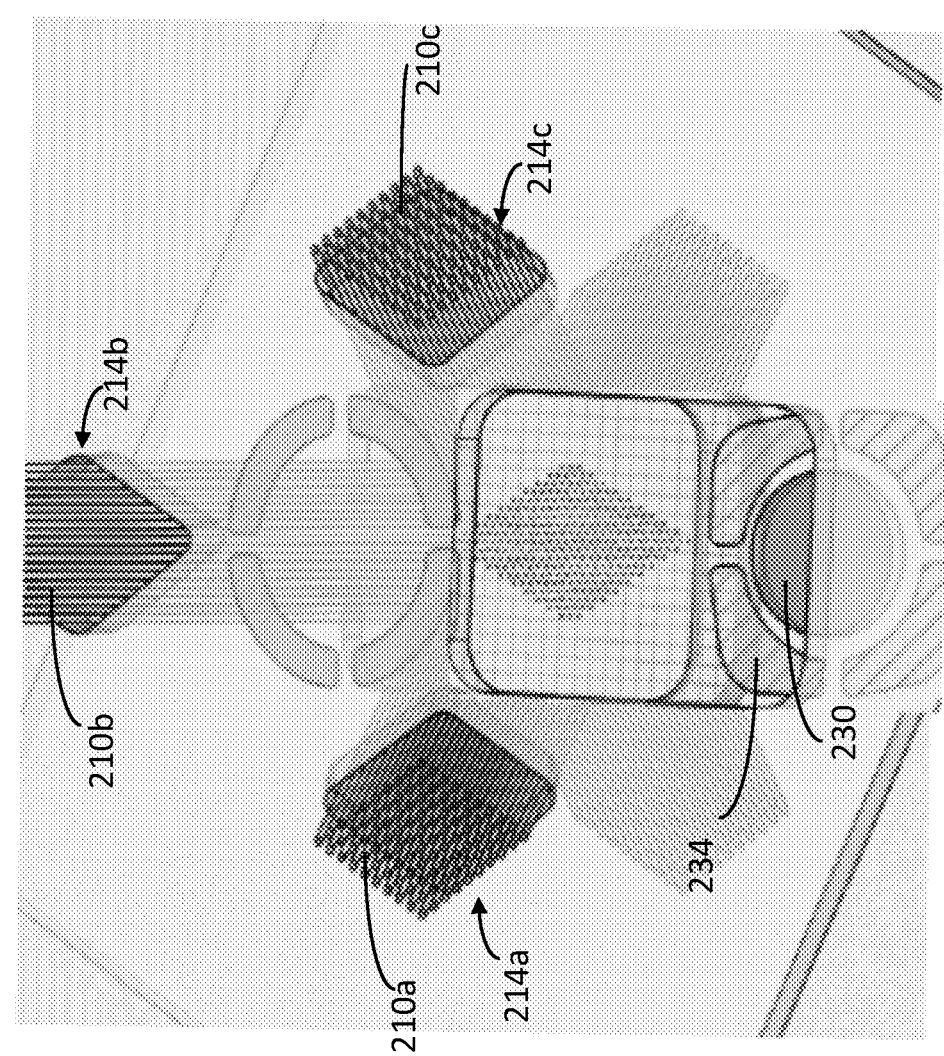
FIG. 11A schematically illustrates a view of the three-layer, 10×10 3-D atom lattice of FIGS. 9A-9C and 10A-10D viewed through the first optical detector port 242a in accordance with certain implementations described herein.
Figure 11B:
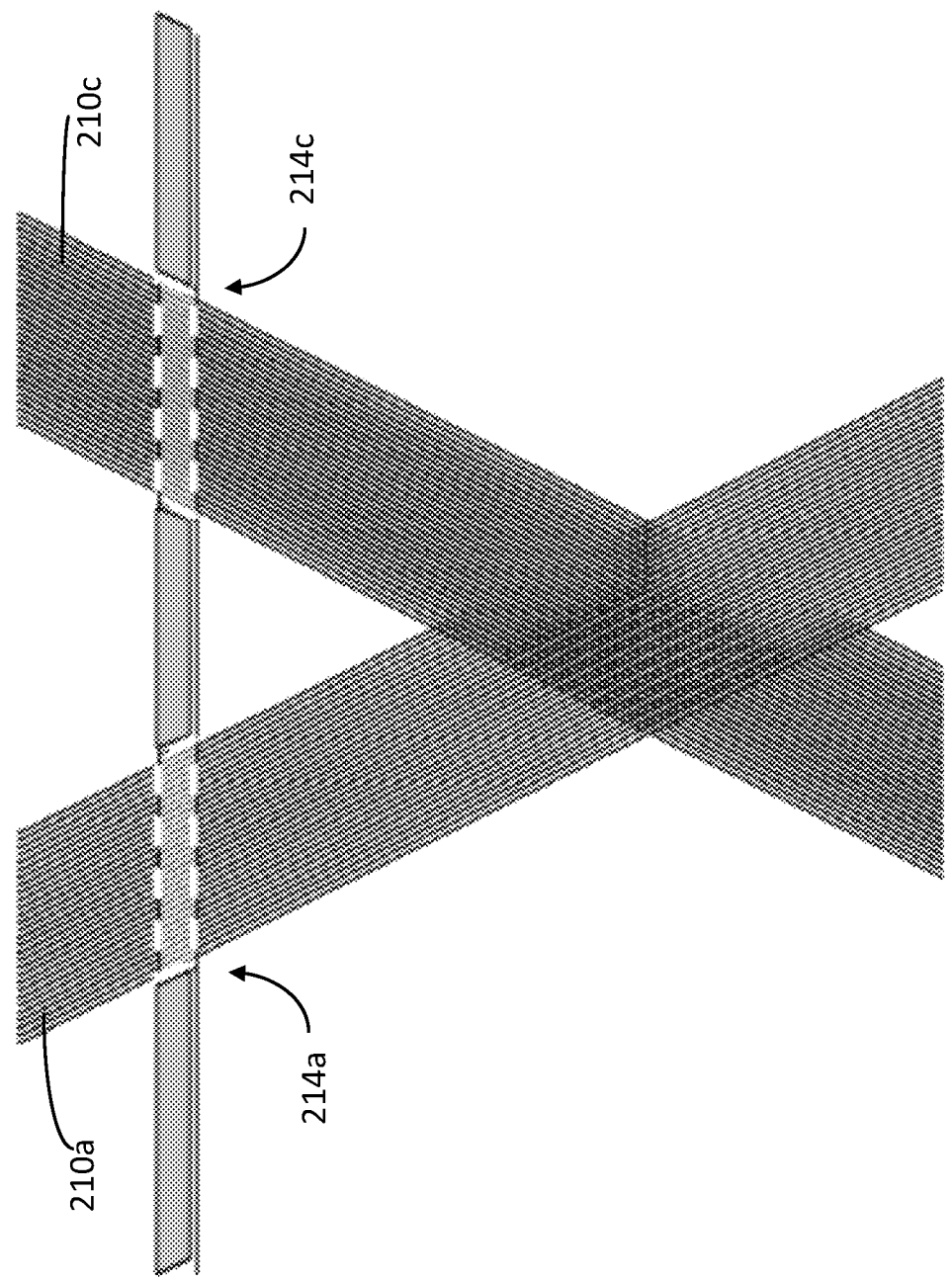
FIG. 11B schematically illustrates a side cross-sectional view of the structure of FIG. 11A in accordance with certain implementations described herein.

FIG. 11A schematically illustrates a view of the three-layer, 10×10 3-D atom lattice of FIGS. 9A-9C and 10A-10D viewed through the first optical detector port 242*a* in accordance with certain implementations described herein. From this viewpoint, each atom of the multi-dimensional, multi-layer qubit lattice arrays is separately visible to the first optical detector 240*a*, such that when addressed by one dedicated optical addressing beam, each atom's state can be individually detected and discriminated. FIG. 11B schematically illustrates a side cross-sectional view of the structure of FIG. 11A. While FIG. 11A shows a three-layer, 10×10 3-D atom lattice, other atom lattices can also be configured to allow each atom in the lattice to be separately and individually addressed and seen (e.g., detected by the first optical detector 242*a*) from optimal access angles above and below the lattice structure. For example, computed aided design (CAD) and analysis can be used to confirm other such configurations for other atom lattices. Certain such implementations allow for entangling a maximum number of qubits simultaneously between nearest neighbors, next-nearest neighbors, next-next-nearest neighbors, etc. such that many more qubits can participate in a single native gate operation. FIG. 11A also schematically illustrates the relative placement of electrode regions 234, magnetic field (e.g., B-field) source 230, detector array 240 (e.g., CCD camera, etc.) and optical beam ports 242*a*, 214*a,b,c* for addressing and manipulating qubits to effect gate operations, and readout in accordance with certain implementations described herein.

Figure 8A:
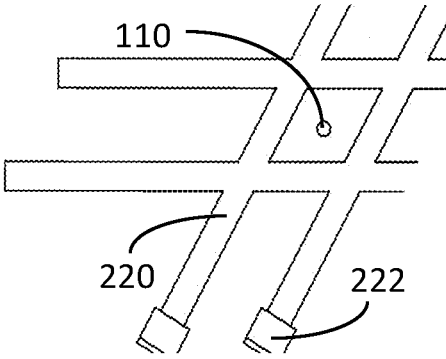
FIGS. 8A-8E schematically illustrate various views of trapping laser light beams in accordance with certain implementations described herein.
Figure 8B:
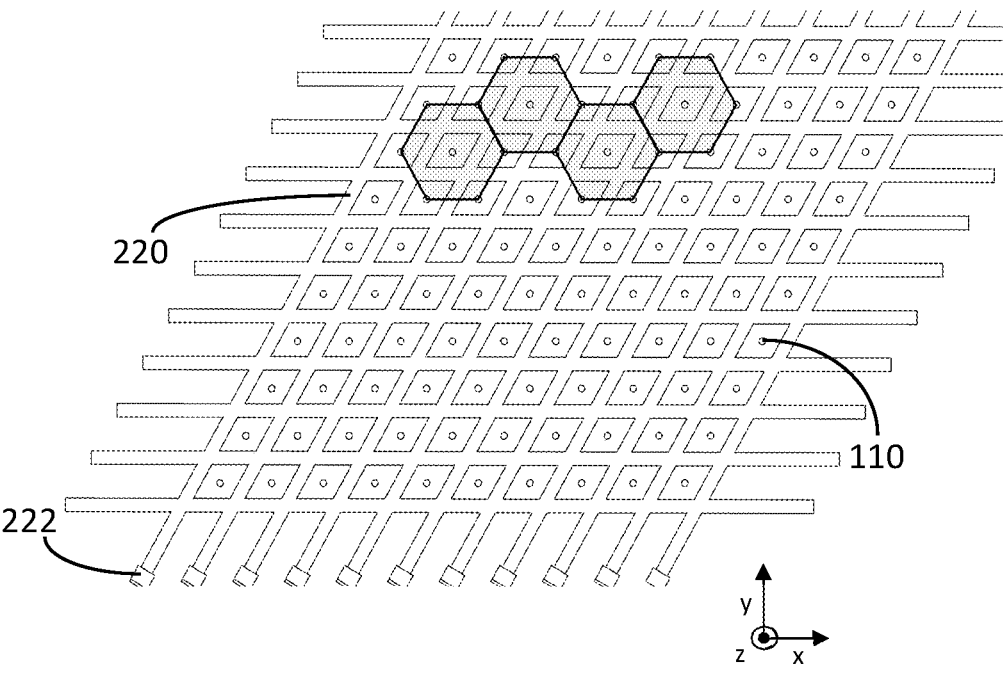
Figure 8C:
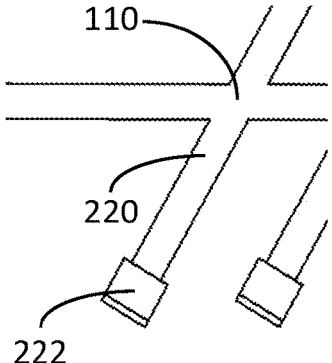
Figure 8D:
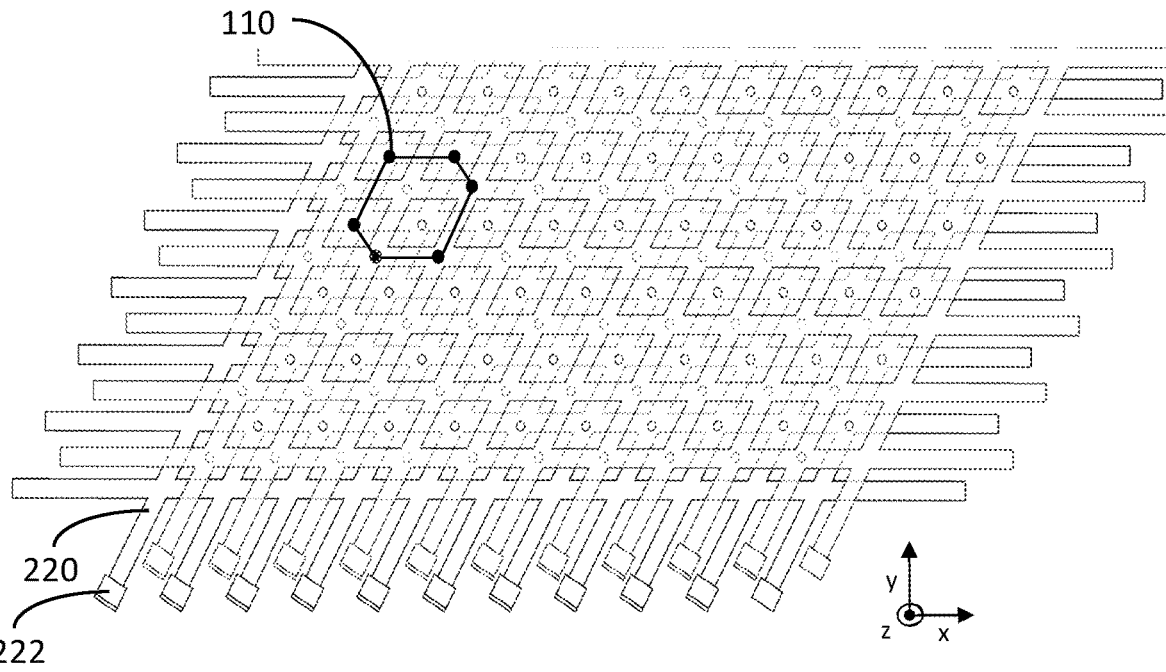
Figure 8E:
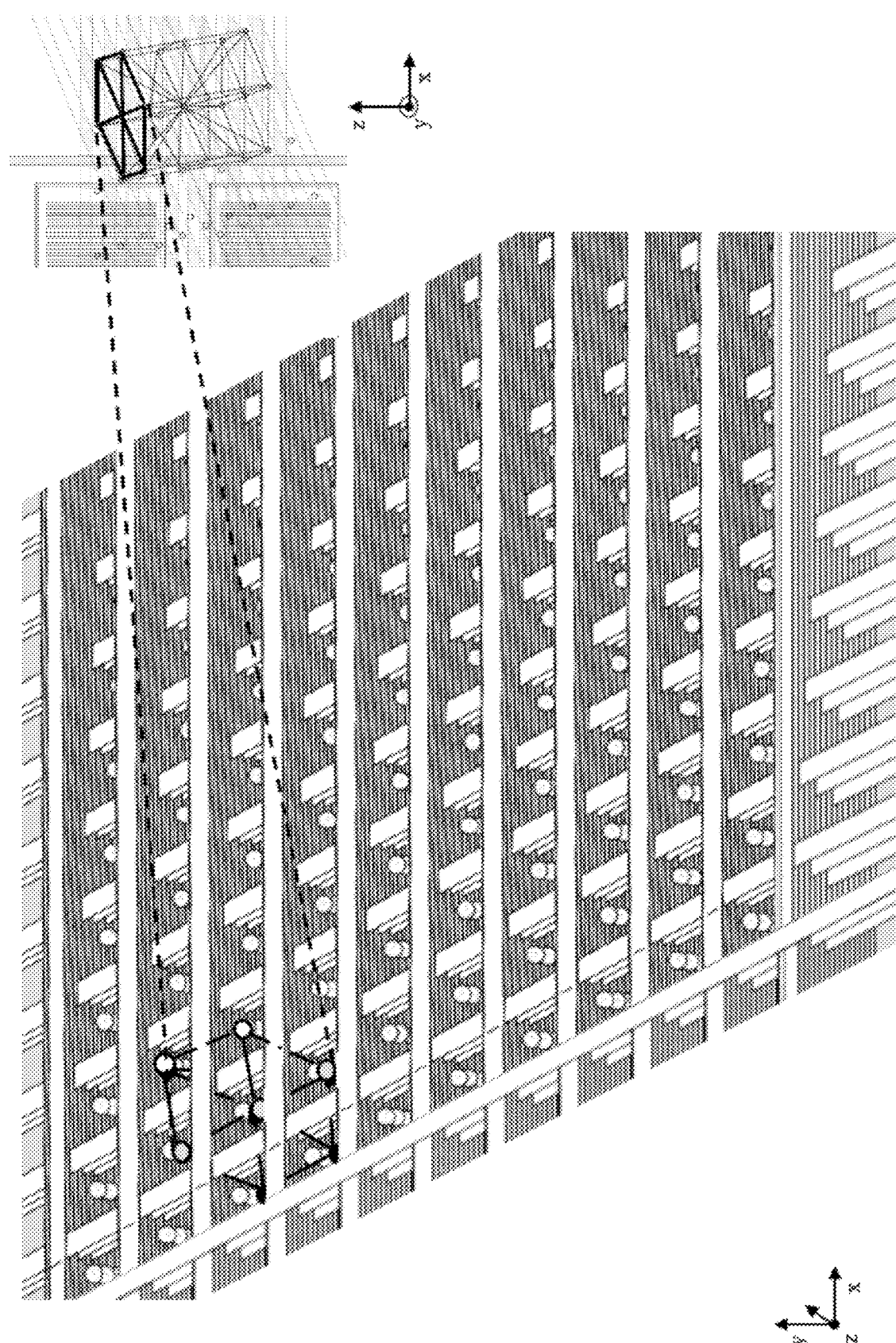
Figure 12:
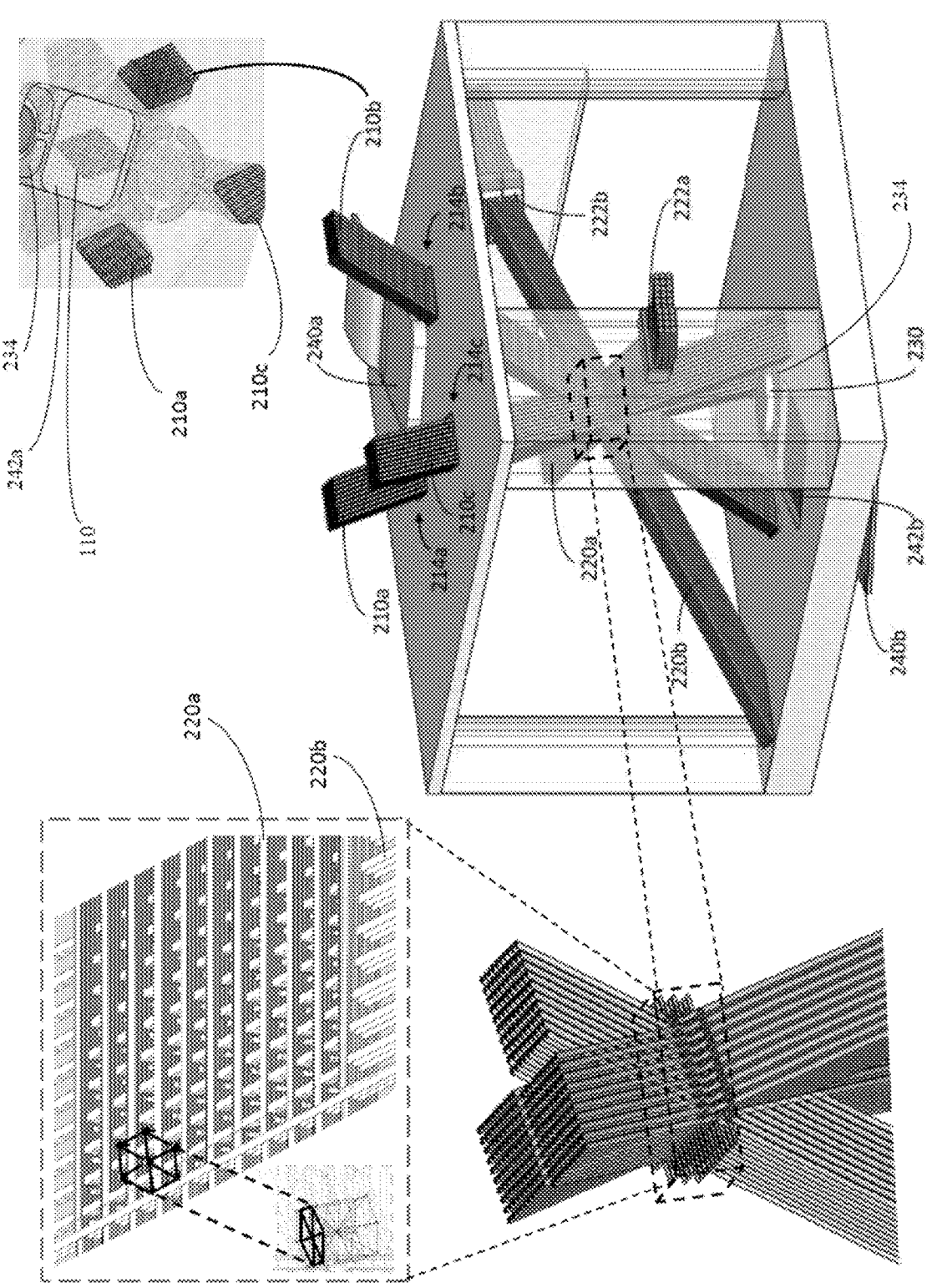
FIG. 12 schematically illustrates a perspective view of an example assembled QC system corresponding to FIGS. 8E, 9A, 10A, and 11A in accordance with certain implementations described herein.

FIG. 12 schematically illustrates a perspective view of the example assembled QC system of FIG. 10A comprising a three-layer, 10×10 atom lattice with three sets of addressing laser light beams 210*a,b,c* and two intersecting arrays of trapping laser light beams 220*a,b* in accordance with certain implementations described herein. FIG. 12 also schematically illustrates the view through the first optical detector port 242*a* (e.g., as shown in FIG. 11A) and two different views of the intersecting arrays of trapping laser light beams 210*a,b,c* (e.g., as shown in FIGS. 8E and 9A).

FIG. 13 shows three tables comparing the total number of qubits that can be entangled simultaneously at given gate fidelities for various multilayer qubit lattice arrays in accordance with certain implementations described herein.

The invention has been described in several non-limiting implementations. It is to be understood that the implementations are not mutually exclusive, and elements described in connection with one implementation may be combined with, rearranged, or eliminated from, other implementations in suitable ways to accomplish desired design objectives. No single feature or group of features is necessary or required for each implementation.

For purposes of summarizing the present invention, certain aspects, advantages and novel features of the present invention are described herein. It is to be understood, however, that not necessarily all such advantages may be achieved in accordance with any particular implementation. Thus, the present invention may be embodied or carried out in a manner that achieves one or more advantages without necessarily achieving other advantages as may be taught or suggested herein.

As used herein any reference to "one implementation" or "some implementations" or "an implementation" means that a particular element, feature, structure, or characteristic described in connection with the implementation is included in at least one implementation. The appearances of the phrase "in one implementation" in various places in the specification are not necessarily all referring to the same implementation. Conditional language used herein, such as, among others, "can," "could," "might," "may," "e.g.," and the like, unless specifically stated otherwise, or otherwise understood within the context as used, is generally intended to convey that certain implementations include, while other implementations do not include, certain features, elements and/or steps. In addition, the articles "a" or "an" or "the" as used in this application and the appended claims are to be construed to mean "one or more" or "at least one" unless specified otherwise.

Language of degree, as used herein, such as the terms "approximately," "about," "generally," and "substantially," represent a value, amount, or characteristic close to the stated value, amount, or characteristic that still performs a desired function or achieves a desired result. For example, the terms "approximately," "about," "generally," and "substantially" may refer to an amount that is within ±10% of, within ±5% of, within ±2% of, within ±1% of, or within ±0.1% of the stated amount. As another example, the terms "generally parallel" and "substantially parallel" refer to a value, amount, or characteristic that departs from exactly parallel by ±10 degrees, by ±5 degrees, by ±2 degrees, by ±1 degree, or by ±0.1 degree, and the terms "generally perpendicular" and "substantially perpendicular" refer to a value, amount, or characteristic that departs from exactly perpendicular by ±10 degrees, by ±5 degrees, by ±2 degrees, by ±1 degree, or by ±0.1 degree. The ranges disclosed herein also encompass any and all overlap, sub-ranges, and combinations thereof. Language such as "up to," "at least," "greater than," "less than," "between," and the like includes the number recited. As used herein, the meaning of "a," "an," and "said" includes plural reference unless the context clearly dictates otherwise. Also, as used in the description herein, the meaning of "in" includes "into" and "on," unless the context clearly dictates otherwise.

As used herein, the terms "comprises," "comprising," "includes," "including," "has," "having" or any other variation thereof, are open-ended terms and intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present). As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain implementations require at least one of X, at least one of Y, and at least one of Z to each be present.

Thus, while only certain implementations have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the implementations described therein.

What is claimed is:

1. A quantum computing (QC) system comprising:
   a first plurality of logical qubits in a first substantially planar region;
   a second plurality of logical qubits in a second substantially planar region that is substantially parallel to the first substantially planar region; and
   a plurality of logical qubit gates each defined by three or more entangled logical qubits, the three or more entangled logical qubits comprising a combination of (a) at least one logical qubit of the first plurality of logical qubits and (b) at least one qubit of the second plurality of logical qubits.

2. The system of claim 1, wherein at least some of the plurality of logical qubit gates form at least one three-dimensional (3-D) gate cell array such that the at least one 3-D gate cell array undergoes multiple-qubit gate operations in which more than two logical qubits participate simultaneously.

3. The system of claim 1, further comprising a third plurality of logical qubits in a third substantially planar region substantially parallel to the second substantially planar region, wherein the plurality of logical qubit gates are defined by three or more entangled logical qubits from at least two of the first plurality of logical qubits, the second plurality of logical qubits, or the third plurality of logical qubits.

4. The system of claim 3, wherein the logical qubits of the first, second, and third pluralities of logical qubits are individually addressable.

5. The system of claim 3, further comprising at least one additional plurality of logical qubits in at least one additional substantially planar region substantially parallel to the third substantially planar region, wherein the plurality of logical qubit gates are defined by three or more entangled logical qubits from at least two of the first plurality of logical qubits, the second plurality of logical qubits, the third plurality of logical qubits, and the at least one additional plurality of logical qubits.

6. The system of claim 1, further comprising a plurality of optical beams defining a plurality of confinement regions comprising first confinement regions arranged in a substantially planar first optical lattice and second confinement regions arranged in a substantially planar second optical lattice substantially parallel to the first optical lattice, wherein the first plurality of logical qubits are in the first optical lattice and the second plurality of logical qubits are in the second optical lattice, and wherein the first confinement region corresponds to the first substantially planar region and the second confinement region corresponds to the second substantially planar region.

7. The system of claim 6, wherein the plurality of confinement regions further comprises third confinement regions arranged in a substantially planar third optical lattice substantially parallel to the second optical lattice, wherein a third plurality of logical qubits are in the third optical lattice.

8. The system of claim 7, wherein the plurality of confinement regions further comprises at least one additional confinement region arranged in at least one additional optical lattice substantially parallel to the third optical lattice, the at least one additional optical lattice comprising at least one additional plurality of logical qubits.

9. The system of claim 7, wherein groups of entangled logical qubits of the first, second, and third pluralities of logical qubits comprise a plurality of multiple-qubit 3-D gate cells, wherein each logical qubit of a multiple-qubit 3-D gate cell of the plurality of multiple-qubit 3-D gate cells quantum-mechanically entangles with at least one other logical qubit of the multiple-qubit 3-D gate cell.

10. The system of claim 7, wherein the confinement regions of each of the first optical lattice, the second optical lattice, and the third optical lattice are arranged in a two-dimensional pattern that is substantially symmetric square-shaped pattern, diamond-shaped pattern, or rhombus-shaped pattern.

11. The system of claim 1, wherein the at least some of the first plurality of logical qubits are fully entangled with the at least some of the second plurality of logical qubits.

12. The system of claim 1, wherein the at least some of the first plurality of logical qubits and/or the at least some of the second plurality of logical qubits are fully entangled with nearest neighboring logical qubits and next-nearest neighboring logical qubits of the first plurality of logical qubits and the second plurality of logical qubits.

13. The system of claim 12, wherein the at least some of the first plurality of logical qubits and/or the at least some of the second plurality of logical qubits are fully entangled with next-next-nearest neighboring logical qubits of the first plurality of logical qubits and the second plurality of logical qubits.

14. The system of claim 1, wherein the at least some of the first plurality of logical qubits and/or the at least some of the second plurality of logical qubits comprise at least one physical qubit comprising one of: naturally occurring atoms; neutral atoms; charged atoms; ions; molecules; artificially formed atoms; Rydberg atoms; nitrogen-vacancy (NV) centers in diamond; Bose-Einstein condensates; electrons; photons; quantum particles; quantum dots; phonons; or transmons.

15. A quantum computing (QC) system comprising:
a plurality of confinement regions to contain logical qubits in a multilayer qubit lattice array comprising more than two dimensions; and
a plurality of quantum gates comprising three or more logical qubits in one or more of the more than two dimensions of the multilayer qubit lattice array, the quantum gates to perform quantum logic operations involving three or more logical qubits natively without reliance on concatenations of one-and two-qubit gates.

16. The system of claim 15, wherein at least some of the quantum logic operations utilize two or more control qubits acting on one or more target qubits natively.

17. The system of claim 16, wherein the quantum logic operations comprise one or more of: singly-controlled, multiple NOT gate; Fanout gate; multiply-controlled NOT gate; Toffoli gate; super Toffoli gate; or multiply-controlled phase gate.

18. The system of claim 15, further comprising electrical and optical elements configured to perform multi-qubit logic operations.

19. The system of claim 15, further comprising electrical traces, optical beam configurations, detectors, and stray light management elements configured to enable low noise addressing and read-out of individual qubits in the multilayer qubit lattice array.

20. The system of claim 15, wherein the multilayer qubit lattice array comprises multiple substantially parallel planar qubit lattice arrays.

21. The system of claim 20, wherein the multiple substantially parallel planar qubit lattice arrays comprise at least a first planar qubit lattice array and a second planar qubit lattice array, the qubits of the first planar qubit lattice array offset from the qubits of the second planar qubit lattice array along a direction substantially parallel to the first planar qubit lattice array.

22. The system of claim 21, further comprising at least one additional planar qubit lattice array comprising qubits aligned with the qubits of the first planar qubit lattice array, aligned with the qubits of the second array, or having an offset along a direction substantially parallel to the second planar qubit lattice array by a magnitude substantially equal to the offset between the first and second planar qubit lattice arrays.

23. The system of claim 21, wherein the offset between the first and second planar qubit lattice arrays enables a plurality of view angles from which each of the logical qubits is optically addressed individually and from which states of each of the logical qubits is detected individually so as to effect multiple-qubit gate operations natively.

24. The system of claim 21, wherein the offset between the first and second planar qubit lattice arrays enables simultaneous entanglement of more qubits at a given interaction distance and within a given volume than in square and cubic lattice configurations.

25. A quantum computing (QC) system comprising:
a first containment zone to confine a first plurality of qubits in a first substantially planar region;
a second containment zone to confine a second plurality of qubits in a second substantially planar region that is substantially parallel to the first substantially planar region; and
a plurality of optical elements to define reconfigurable multi-qubit gates via entanglement of three or more qubits, the three or more qubits comprising a combination of (a) at least one qubit of the first plurality of qubits and (b) at least one qubit of the second plurality of qubits.

26. The system of claim 25, wherein the first plurality of qubits and the second plurality of qubits are positioned in the first containment zone and the second containment zone, respectively, to provide a line of sight to each one of the first plurality of qubits and the second plurality of qubits by corresponding ones of the plurality of optical elements, and wherein the line of sight and the plurality of optical elements enable individually addressable logical qubits.

27. The system of claim 25, wherein a first intraplanar distance between qubits of the first plurality of qubits and a second intraplanar distance between qubits of the second plurality of qubits comprise less than about 15 microns, and wherein an interplanar distance between qubits of the first plurality of qubits and the second plurality of qubits comprises less than about 15 microns.

* * * * *